(12) United States Patent
Walther et al.

(10) Patent No.: US 11,050,243 B2
(45) Date of Patent: Jun. 29, 2021

(54) SAFETY MODULE AND FIELD-BUS SYSTEM COMPRISING A SAFETY MODULE

(71) Applicant: Beckhoff Automation GmbH, Verl (DE)

(72) Inventors: Lars Walther, Leopoldshöhe (DE); Jens Heidenhöfer, Verl (DE); Michael Jost, Dörentrup (DE); Uwe Prüssmeier, Lemgo (DE); Christian Jürgenhake, Rietberg (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 16/876,255

(22) Filed: May 18, 2020

(65) Prior Publication Data

US 2020/0280182 A1     Sep. 3, 2020

Related U.S. Application Data

(63) Continuation of application No. PCT/EP2018/081431, filed on Nov. 15, 2018.

(30) Foreign Application Priority Data

Nov. 27, 2017 (DE) .................. 10 2017 127 983.0

(51) Int. Cl.
*H02H 7/22* (2006.01)
*H04L 12/40* (2006.01)

(52) U.S. Cl.
CPC ............... *H02H 7/22* (2013.01); *H04L 12/40* (2013.01)

(58) Field of Classification Search
CPC ... H02H 7/22; H02H 1/06; H02H 3/00; H04L 12/40; H04L 12/10; H04L 12/40045
See application file for complete search history.

(56) References Cited

U.S. PATENT DOCUMENTS

| 6,175,780 B1 | 1/2001 | Engel |
| 7,230,813 B1 | 6/2007 | Canova et al. |

(Continued)

FOREIGN PATENT DOCUMENTS

| CN | 101587463 A | 11/2009 |
| CN | 101931218 A | 12/2010 |

(Continued)

OTHER PUBLICATIONS

Office Action dated Feb. 2, 2021 in connection with Chinese patent application No. 201880087836.8, 12 pages including English translation.

(Continued)

*Primary Examiner* — Bryan R Perez

(74) *Attorney, Agent, or Firm* — Dorsey & Whitney LLP

(57) ABSTRACT

A safety module for a field-bus system comprising a switch-on unit, a control unit, a supply input provided to feed supply power, a first supply output provided to relay secured supply power to a consumer, a first switching element to electrically connect or disconnect the supply input and the first supply output, and a supply module to provide an operating power via an operating-power-supply line for operating the control unit. The control unit is connected to the first switching element to secure the supply power being relayed via the first supply output by actuating the first switching element. The supply module is electrically connected to the supply input and to a field-bus-power input. The field-bus-power input is provided to feed a field-bus power into the safety module for operating the switch-on unit. The supply module is provided to generate the operating power either from the supply power or field-bus power.

15 Claims, 9 Drawing Sheets

(56) References Cited

U.S. PATENT DOCUMENTS

| | | |
|---|---|---|
| 7,724,488 B2 | 5/2010 | Krauss et al. |
| 7,899,975 B2 | 3/2011 | Driehorn et al. |
| 7,936,547 B2 | 5/2011 | Dougherty et al. |
| 8,704,574 B2 | 4/2014 | Prabhuk et al. |
| 2002/0108065 A1 | 8/2002 | Mares |
| 2007/0213854 A1 | 9/2007 | El-sayed |
| 2009/0315395 A1* | 12/2009 | Rogoll .............. H04L 12/40189 307/23 |
| 2013/0207705 A1 | 8/2013 | Prabhuk et al. |
| 2015/0295395 A1 | 10/2015 | Wortberg et al. |
| 2016/0322805 A1 | 11/2016 | Frank et al. |
| 2016/0356827 A1 | 12/2016 | Schiemann et al. |

FOREIGN PATENT DOCUMENTS

| | | |
|---|---|---|
| CN | 102087524 A | 6/2011 |
| CN | 105283815 A | 1/2016 |
| CN | 107113181 A | 8/2017 |
| DE | 3702517 A1 | 8/1988 |
| DE | 10031964 C1 | 2/2002 |
| DE | 102006025604 A1 | 11/2007 |
| DE | 102006025605 A1 | 11/2007 |
| DE | 60224371 T2 | 1/2009 |
| DE | 102011014423 A1 | 1/2012 |
| DE | 102010036210 A1 | 3/2012 |
| DE | 102011120466 A1 | 6/2013 |
| DE | 102011083710 B4 | 2/2014 |
| DE | 202014003691 U1 | 7/2014 |
| DE | 102013206147 A1 | 10/2014 |
| DE | 102014200052 A1 | 7/2015 |
| DE | 102014200946 A1 | 7/2015 |
| DE | 102014005524 A1 | 10/2015 |
| DE | 102014224173 A1 | 6/2016 |
| DE | 102014226164 A1 | 6/2016 |
| DE | 102015104623 A1 | 9/2016 |
| DE | 102016201651 A1 | 11/2016 |
| DE | 102015116800 B3 | 12/2016 |
| DE | 102015211625 A1 | 12/2016 |
| DE | 102015213744 A1 | 1/2017 |
| EP | 1055991 A1 | 11/2000 |
| EP | 1710887 A2 | 10/2006 |
| EP | 2020068 A1 | 2/2009 |
| EP | 0949733 B1 | 5/2011 |
| EP | 2068337 B1 | 1/2012 |
| EP | 1294069 B2 | 4/2015 |
| EP | 2932571 A1 | 10/2015 |
| EP | 3183789 A1 | 6/2017 |
| WO | 2016083486 A1 | 6/2016 |
| WO | 2016135126 A1 | 9/2016 |
| WO | 2016150628 A1 | 9/2016 |
| WO | 2016207264 A1 | 12/2016 |

OTHER PUBLICATIONS

International Search Report dated Apr. 11, 2019 in connection with PCT/EP2018/081431, 5 pages including English translation.

* cited by examiner

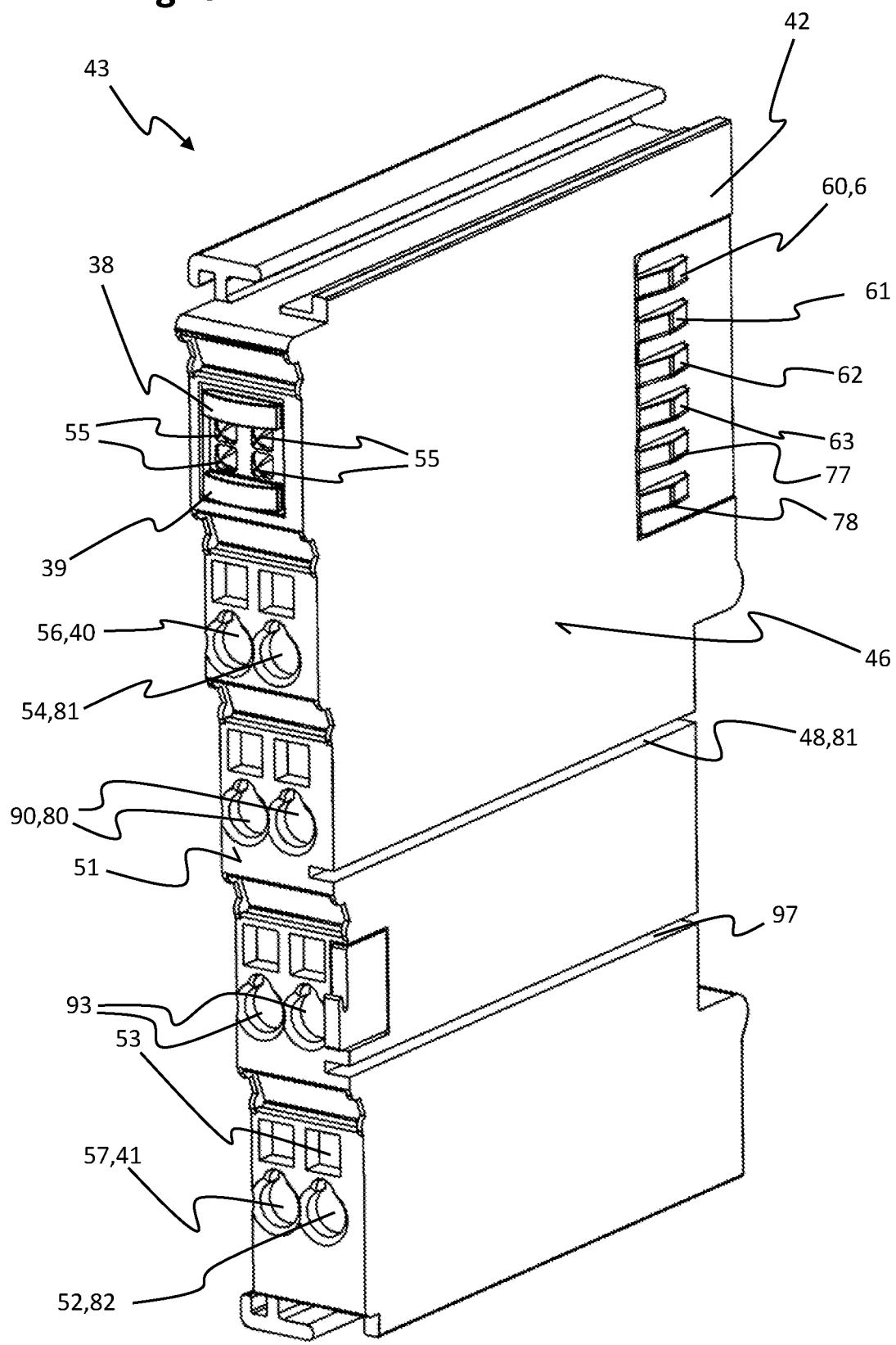

SAFETY MODULE AND FIELD-BUS SYSTEM COMPRISING A SAFETY MODULE

CROSS-REFERENCE TO RELATED APPLICATIONS

This application claims priority to International Patent Application PCT/EP2018/081431, filed Nov. 15, 2018, entitled CIRCUIT-BREAKER MODULE AND FIELD BUS SYSTEM COMPRISING A CIRCUIT-BREAKER MODULE, and German application DE 10 2017 127 983.0, filed Nov. 27, 2017, entitled SICHERUNGSMODUL UND FELDBUSSYSTEM MIT SICHERUNGSMODUL, each of which is incorporated by reference herein, in the entirety and for all purposes.

FIELD

The present invention relates to a safety module and to a field-bus system comprising a safety module.

BACKGROUND

The prior art discloses devices for protecting consumers and electrical conductors. Consumers and electrical conductors may e.g. be protected against an inadmissibly high electrical current. An excessively high electrical current that exceeds the nominal current of a consumer in such a way that the consumer may be damaged as a consequence may e.g. occur in case of a short circuit. Admissible electrical currents may be determined in standards such as DIN VDE 0298-4:2013-06.

The publication of DE 10 2016 025 605 A1 discloses a device for self-actuated switching off or switching on of an electrical consumer. Said device comprises a control unit that is connected to an electronic control member. The control unit is embodied to switch off the electrical consumer via a triggering characteristic. The control unit and the consumer may be operated by a shared supply voltage. For an emergency operation of the control unit in case the supply voltage fails, the device may have a power storage which may be charged by the supply voltage.

According to DE 10 2006 025 605 A1 the power storage has to be arranged in the device as an additional element, thus causing additional time and effort involved in the installation.

SUMMARY

The invention provides an improved safety module and a field-bus system comprising an improved safety module.

According to one aspect, a safety module for a field-bus system comprises a switch-on unit, a control unit, a supply input embodied to feed in a supply power into the safety module, a first supply output embodied to relay the supply power to a consumer as a secured supply power, a first switching element embodied to electrically connect or to electrically disconnect the supply input and the first supply output, and a supply module embodied to provide an operating power via an operating-power-supply line for operating the control unit, wherein the supply module is electrically connected to the supply input by a supply line and a supply-connecting line comprising the supply input and to a field-bus-power input by a field-bus-power line and a field-bus-power-connecting line. The field-bus-power input is embodied to feed in a field-bus power into the safety module for operating the switch-on unit. The supply module is embodied to generate the operating power either from the supply power or from the field-bus power. The switch-on unit is connected to the control unit via a data line and embodied to connect the safety module to a field-bus subscriber via a field bus, as a result of which an exchange of field-bus data is enabled between the control unit and the field-bus subscriber. The control unit is connected to the first switching element and embodied to secure relaying the supply power via the first supply output as a secured supply power by actuating the first switching element.

According to another aspect, a field-bus system has a field-bus subscriber, a safety module embodied as a further field-bus subscriber of the field-bus system and a signal module embodied as a further field-bus subscriber of the field-bus system for connecting a consumer to the field-bus system. The field-bus subscriber, the safety module and the signal module are connected with one another via a field bus. The safety module comprises a switch-on unit, a control unit, a supply input embodied to feed in a supply power into the safety module, a first supply output embodied to relay the supply power to a consumer as a secured supply power, and a first switching element embodied to electrically connect or disconnect the supply input and the first supply output. The switch-on unit is connected to the control unit via a data line and embodied to connect the safety module to a field-bus subscriber via a field bus, as a result of which an exchange of field-bus data is enabled between the control unit and the field-bus subscriber. The control unit is connected to the first switching element and embodied to secure the relaying of the supply power as a secured supply power via the first supply output by actuating the first switching element. The signal module comprises a further control unit and a further switch-on unit. The further switch-on unit is connected to the further control unit via a further data line and embodied to connect the signal module to the field-bus subscriber via the field bus, as a result of which an exchange of field-bus data is enabled between the further control unit and the field-bus subscriber. The further control unit is embodied for connecting the consumer to the field-bus system, wherein the signal module comprises a further supply input embodied to feed in the secured supply power and a further supply output embodied for relaying the secured supply power to the consumer. The first supply output and the further supply input are electrically connected to each other.

EXEMPLARY EMBODIMENTS

The supply module allows for providing the operating power to the control unit in case that either the supply power or the field-bus power fails, or the supply energy or the field-bus power is outside of a predetermined value range for the supply power or outside of a predetermined value range for the field-bus power so that it is not possible to generate the operating power. The supply module is electrically connected to the control unit by the operating-power line in order to provide the control unit with the generated operating power.

The safety module is also embodied to e.g. secure the consumer against an electrical current that is too high. A further advantage is that the safety module may be connected to a field-bus subscriber of the field-bus system via the field bus. The field-bus subscriber may be embodied as a controller of the field-bus system. The field-bus subscriber may also be a master or, respectively, a field-bus master of the field-bus system. Likewise, the field-bus subscriber may be one or a plurality of random other subscribers in the field-bus system such as field-bus couplers and/or field-bus terminals which may also be referred to as bus terminals. The safety module itself may thus be a field-bus subscriber and thus be addressed in the same way as an ordinary subscriber of the field-bus system. An external wiring for connecting the safety module to the field bus is thus omitted. A further advantage is that the safety module already fulfils a protective function when the supply power is applied, even if the field bus is interrupted or not yet operable.

In an embodiment, the supply module is embodied to generate the operating power from the field-bus power if the supply power is outside of a predetermined value range for the supply power. Advantageously, the field-bus is not interfered with or interrupted if the supply power cannot be used to provide the operating power to the control unit. Although e.g. an overcurrent-protection function of the safety module is not provided when the supply energy is outside of the predetermined supply-power-value range, the control unit must further be provided with the operating power generated from the field-bus power so that the switch-on unit may continue to receive field-bus data from the control unit. In this manner, it is safeguarded that the field bus is not interfered with or interrupted. However, it is also possible that the supply module is embodied to generate the operating power from the supply power in case the field-bus power is outside of a predetermined supply-power-value range. In this case, the field-bus power is thus primarily used to generate the operating power while the supply power may be used as an alternative to generate the operating power.

In an embodiment the control unit is embodied to monitor, within the framework of protecting the first supply output, a parameter of the supply power and/or a parameter of the secured supply power by a first detection device connected to the control unit. The control unit is embodied to electrically disconnect the supply input and the first supply output by the first switching element within the framework of securing, as soon as the monitored parameter is outside of the predetermined value range.

The consumer is secured by electrically separating the supply input and the first supply output if the monitored parameter lies outside of a predetermined value range. The parameter of the supply power and/or the parameter of the secured supply power may e.g. be an electrical current, an electrical voltage, a time-related development of the electrical current or of the electrical voltage or a time period within which an electrical current is to be limited. For example, the parameter of the supply power and/or the parameter of the secured supply power may also be a combination of the electrical current with the electrical voltage and/or a combination of the time-dependent development of the electrical current and of the electrical voltage and/or a combination of an electrical current with a time period within which an electrical current is to be limited, and/or a combination of an electrical voltage with a time period within which an electrical current is to be limited.

In an embodiment, the control unit is embodied to exchange an information relating to the securing of the first supply output with the field-bus subscriber by the exchange of field-bus data via the switch-on unit.

In an embodiment, the control unit is embodied to transmit the information relating to the securing to the field-bus subscriber. The information relating to the securing of the first supply output is an electrical voltage detected by the first detection device, a detected electrical current, a detected time-dependent development of the electrical voltage or of the electrical current, a detected switching state of the first switching element or a time period monitored by the control unit within which the first switching element limits an electrical current. Advantageously, the state of the safety module may be monitored in this manner.

In an embodiment, the control unit is embodied to receive the information relating to the securing from the field-bus subscriber. The information relating to the securing of the first supply output is a predetermined range of values of an electrical voltage, an electrical current, a time-related development of the electrical voltage or of the electrical current or of a time period within which the first switching element limits an electrical current. Advantageously, the control unit may use the information relating to the securing in order to secure the supply output.

In an embodiment, the safety module comprises a first isolation device. The first isolation device is switched on to the field-bus-power-connecting line. As a result, the field-bus-power-connecting line comprises a first section and a second section. The first isolation device is embodied to galvanically disconnect the first section and the second section of the field-bus-power-connecting line from each other.

In an embodiment, the safety module comprises a second isolation device. The second isolation device is switched on to the data line. As a result, the data line has a first section and a second section. The second isolation device is embodied to galvanically disconnect the first and the second section of the data line from each other.

The supply line and the field-bus-power line are galvanically disconnected from each other due to a galvanic separation of the first and second section of the field-bus-power-connecting line and due to a galvanic separation of the first and second section of the data line. As a result, the power supply is galvanically disconnected. Thereby, a transmission of interference signals between the supply-power line and the field-bus-power line may be prevented. Particularly, as a result the field-bus-power line is galvanically disconnected from the operating-power line, thus allowing for preventing transmission of interference signals between the field-bus-power line and the operating-power line. The supply-power line and the communication channel of the field bus are galvanically disconnected from each other, as well. Thus, a transmission of interference signals between the supply-power line and the communication channel via which an exchange of field-bus data may be carried out, may be avoided. Hence, in total, the supply-power line and the field bus are galvanically disconnected from each other.

In an embodiment, the safety module comprises a second supply output for relaying the secured supply power to a further consumer, and a second switching element embodied to electrically connect or to electrically disconnect the supply input and the second supply output. The second switching element is connected to the control unit. The first switching element and the second switching element may be actuated independently from each other by the control unit. The control unit is embodied to secure the relaying of the supply power as secured supply power via the second supply output by actuating the second switching element. The control unit is embodied to monitor, within the framework of securing, a further parameter of the supply power and/or a further parameter of the secured supply power by a second detection device connected to the control unit. The control unit is embodied to electrically disconnect the supply input and the second supply output by the second switching element within the framework of the securing, as soon as the further monitored parameter is outside of a further predetermined value range. The control unit is embodied to exchange an information relating to the securing of the second supply output with the field-bus subscriber by the exchange of field-bus data via the switch-on unit. Advantageously, the safety module comprising the second switching element is embodied to secure a further consumer e.g. against an excessively high electrical current.

The further parameter of the supply power and/or the further parameter of the secured supply power may e.g. be an electrical current, an electrical voltage, a time-dependent development of the electrical current or of the electrical voltage, or a time duration within which an electrical current is to be limited. For example, the further parameter of the supply power and/or the further parameter of the secured supply power may also be a combination of the electrical current with the electrical voltage and/or a combination of a time-related development of the electrical current and the electrical voltage and/or a combination of an electrical current having a time duration within which an electrical current is to be limited, and/or a combination of an electrical voltage with a time duration within which an electrical current is to be limited.

The control unit may e.g. be embodied to transmit the information relating to the securing of the second supply output to the field-bus subscriber. The information relating to the securing of the second supply output may be an electrical voltage detected by the second detection device, a detected electrical current, a detected time-dependent development of the electrical voltage or of the electrical current, a detected switching state of the second switching element or a time duration monitored by the control unit, within which time duration the second switching element limits an electrical current.

The control unit may also be embodied to receive the information relating to the securing of the second supply output from the field-bus subscriber. The information relating to the securing of the second supply output may be a predetermined value range of an electrical voltage, of an electrical current, of a time-related development of the electrical voltage or of the electrical current or of a time duration within which the second switching element limits an electrical current. Advantageously, the control unit may use the information relating to the securing of the second supply output in order to secure the second supply output.

In an embodiment, the switch-on unit, the control unit, the first switching element and the supply module are arranged in a shared housing. Advantageously, the safety module is compact as a result and may be added as a bus terminal in group of bus terminals.

In an embodiment, the housing has a side face. The side face is embodied to abut directly on a further side face of a further housing of a signal module embodied to connect the consumer to the field-bus system. The first supply output is embodied at the side face as a contact structure. The contact structure is embodied to directly abut on a further supply input of the signal module embodied at the further side face as a further contact structure for relaying the secured supply power and to electrically contact the further contact structure, whereby the safety module may be directly added to the signal module. Advantageously, the secured supply power may be forwarded via the contact structures without necessitating additional wiring.

In an embodiment, the housing comprises a front side embodied in a transverse manner with regard to the side face. The second supply output is embodied as a contact element accessible from the front side of the electrical contacting for relaying the secured supply power to the further consumer.

A field-bus system comprises a field-bus subscriber, a safety module embodied as a further field-bus subscriber of the field-bus system and a signal module embodied as a further field-bus subscriber of the field-bus system for connecting the consumer to the field-bus system. The field-bus subscriber, the safety module and the signal module are interconnected via a field bus. The safety module comprises a switch-on unit, a control unit, a supply input embodied to feed in a supply power into the safety module, a first supply output for relaying the supply power as secured supply power to the consumer and a first switching element embodied for electrically connecting or electrically disconnecting the supply input and the first supply output. The switch-on unit is connected to the control unit via a data line and embodied for connecting the safety module to the field-bus subscriber via the field bus, thus enabling an exchange of field-bus data between the control unit and the field-bus subscriber. The control unit is connected to the first switching element and embodied to secure the relaying of the supply power as secured supply power via the first supply output by actuating the first switching element. The signal module comprises a further control unit and a further switch-on unit. The further switch-on unit is connected to the further control unit via a further data line and embodied to connect the signal module to the field-bus subscriber via the field bus, thus enabling an exchange of field-bus data between the further control unit and the field-bus subscriber. The further control unit is embodied to connect the consumer to the field-bus system. The signal module comprises a further supply input to feed in the secured supply power and a further supply output embodied for relaying the secured supply power to the consumer. The first supply output and the further supply input are electrically connected with each other.

In an embodiment of the field-bus system, the safety module comprises a supply module embodied for providing an operating power via an operating-power-supply line for operating the control unit. The supply module is electrically connected to the supply input by a supply line and a supply-connecting line and to a field-bus-power input by a field-bus-power line and a field-bus-power-connecting line. The field-bus-power input is embodied to feed in a field-bus power into the safety module in order to operate the switch-on unit. The supply module is embodied to generate the operating power either from the supply power or from the field-bus power.

In an embodiment of the field-bus system, the switch-on unit, the control unit, the first switching element and the supply module are arranged in a shared housing. The further switch-on unit, the further control unit and a further switching element for actuating the consumer by a further control unit are arranged in a further housing. The housing comprises a side face. The side face directly abuts on a further side face of the further housing of the signal module. The first supply output is embodied as a contact structure at the side face. In order to relay the secured supply power, the contact structure directly abuts on a further supply input of the signal module embodied as a further contact structure at the further side face, the safety module being directly connected up to the signal module as a result.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 shows a perspective view of the safety module embodied as a bus terminal.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Also, signal names used below are exemplary names, indicative of signals used to perform various functions in a given memory device. In some cases, the relative signals may vary from device to device. Furthermore, the circuits and devices described below and depicted in the figures are merely exemplary of embodiments of the invention. As recognized by those of ordinary skill in the art, embodiments of the invention may be utilized with any memory device.

Figure 1:
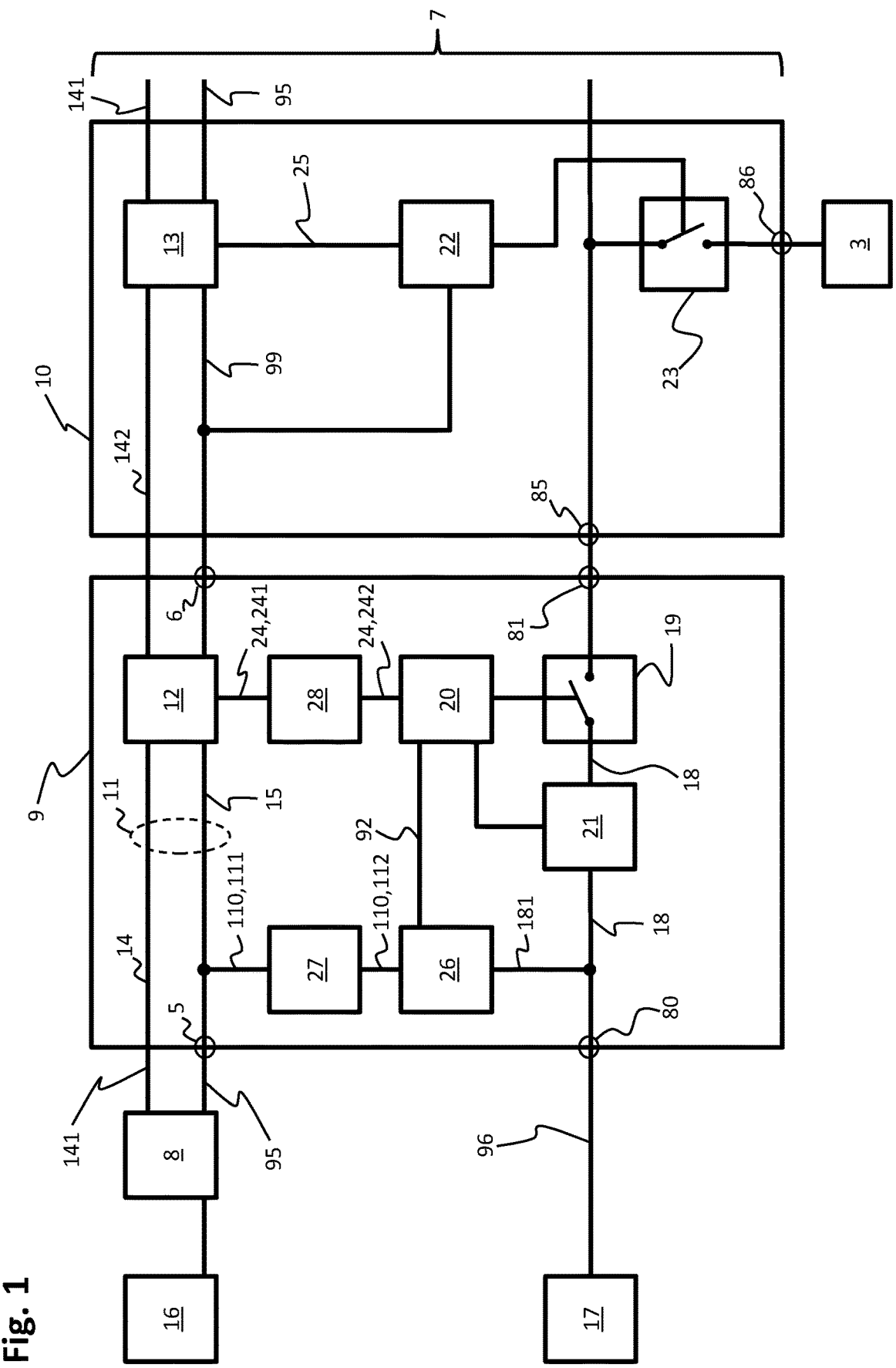
FIG. 1 shows a field-bus system comprising a safety module according to a first embodiment.

FIG. 1 shows a schematic view of a field-bus system 7. The field-bus system 7 comprises a field-bus subscriber 8, a safety module according to a first embodiment embodied as a subscriber of the field-bus system 7 and a signal module 10 embodied as a subscriber of the field-bus system 7 for connecting a consumer 3 to the field-bus system 7.

The field-bus subscriber 8 may e.g. be a controller having an integrated field-bus master. The field-bus subscriber 8 may, however, also be a field-bus coupler. The field-bus coupler may in turn itself be connected to the controller so that the controller is superordinate to the field-bus coupler. Insofar, a field-bus subscriber 8 according to the aforesaid definition may also be referred to as a superordinate field-bus subscriber 8. Of course, the field-bus system 8 may comprise further field-bus subscribers 8 carrying out any desired tasks within the field-bus system 7. Accordingly, the safety module 9 and/or the signal module 10 may be field-bus subscribers 8 in the sense of the present invention, as well. The following exemplary description of embodiment examples refers to field-bus systems 7 having a superordinate field-bus subscriber 8. Hence, in the following reference will be made to a superordinate field-bus subscriber 8. However, this is not meant to be limiting in terms of the invention.

The superordinate field-bus subscriber 8, the safety module 9 and the signal module 10 are connected with one another via a field bus 11. In order to be connected to the field bus 11, the safety module 9 comprises a switch-on unit 12 and the signal module 10 comprises a further switch-on unit 13. The switch-on unit 12 and the further switch-on unit 13 are connected to the superordinate field-bus subscriber 8 via the field bus 11 and embodied to exchange field-bus data between the superordinate field-bus subscriber 8, the safety module 9 and/or the signal module 10. The switch-on unit 12 and/or the further switch-on unit 13 may e.g. be embodied as application-specific integrated circuits. The switch-on unit 12 and/or the further switch-on unit 13 may also be referred to as field-bus slave controller.

The field bus 11 comprises a communication channel 14, 141, 142. The communication channel 14, 141, 142 comprises a first communication-channel section 14, a second communication-channel section 141 and a third communication-channel section 142. The field bus 11 further comprises a field-bus-power-supply line 95, a field-bus-power line 15 and a field-bus line 99. The first communication-channel section 14 and the field-bus-power line 15 are arranged within the safety module 9. The third communication-channel section 142 and the field-bus line 99 are arranged within the signal module 10. The second communication-channel section 141 and the field-bus-power-supply line 95 are arranged outside of the safety module 9 and outside of the signal module 10. The first communication-channel section 14, the second communication-channel section 141 and the third communication-channel section 142 are electrically connected with one another. The field-bus-power line 15, the field-bus-power-supply line 95 and the field-bus line 99 are electrically connected to one another, as well. The first communication-channel section 14 and the third communication-channel section 142 may e.g. be connected to each other by wiring. The field-bus-power line 15 and the field-bus line 99, too, may be electrically connected by wiring. A further possibility for an electrical connection between the first communication-channel section 14 and the third communication-channel section 142 and between the field-bus-power line 15 and the field-bus line 99 is explained in conjunction with the description of FIGS. 5 and 6. With the first communication-channel section 14, the second communication-channel section 141 and the third communication-channel section 142, the field-bus data, e.g. messages based on the EtherCAT protocol, may be exchanged between the superordinate field-bus subscriber 8, the safety module 9 and/or the signal module 10. In the entire context of the present description, an exchange of field-bus data refers to a data flow that may be unidirectional and regardless of the direction, as well as bidirectional.

For a supply with electrical power in order to operate the switch-on unit 12 and/or the further switch-on unit 13, the field-bus-power-supply line 95 of the field bus 11 is provided that provides field-bus power to the switch-on unit 12 and/or to the further switch-on unit 13. The field-bus power is provided by a first power-supply unit 16. The first power-supply unit 16 may e.g. be embodied to provide a direct voltage as a field-bus power. A typical direct voltage provided by the first power-supply unit 16 may e.g. amount to 5V. The field-bus power is fed into the safety module 9 by a field-bus-power input 5, is forwarded within the safety module 9 by the field-bus-power line 15 and discharged from the safety module 9 by a field-bus-power output 6. The field-bus-power line 15 thus electrically connects the field-bus-power input 5 and the field-bus power output 6. The signal unit 10 and/or further field-bus subscribers may have an analogous design with regard to the field-bus-power input 5, the field-bus-power line 15 and the field-bus-power output 6.

Whereas the signal module 10 is embodied to connect the consumer 3 to the field-bus system 7, the safety module 9 is embodied to secure a supply power provided for operating the consumer 3, i.e. to provide a secured supply power for operating the consumer. For this purpose, the safety module 9 comprises a supply input 80 for feeding in the supply power provided by the second power-supply unit 17 and transmitted or, respectively, relayed by a supply-power line 96 into the safety module 9. A direct voltage e.g. of 24V may be provided via the supply input 80. According to the EN61131-2 standard, a range of 20.4V to 28.8V is admissible for a direct voltage. In order to relay the supply power as secured supply power to the consumer 3, the safety module 9 comprises a first supply output 81. The supply power fed in at the supply input 80 is relayed via a supply line 18 within the safety module 9. The supply input 80 and the first supply output 81 are each electrically connected to a first switching element 19. The first switching element 19 is provided to electrically connect the supply input 80 to the first supply output 81 or to electrically disconnect them from each other.

The first switching element 19 may e.g. be an electronic switching element. An electronic switching element may e.g. consist of a transistor or a plurality of connected transistors. The transistor may e.g. be a metal-oxide-semiconductor field-effect transistor. In this case, the supply input 80 is electrically connected to the drain electrode and the first supply output 81 is electrically connected to the source electrode of the transistor.

In order to actuate the first switching element 19, the safety module 9 comprises a control unit 20. The control unit 20 is connected to the first switching element 19 and embodied to secure the relaying of the supply power as a secured supply power via the first supply output 81. In order to secure the first supply output 81, the control unit 20 is connected to a first detection device 21 and monitors a parameter of the supply power. The first detection device 21 is for this purpose connected to the supply line 18. The first detection device 21 may be connected to the supply line 18 either on the side of the supply input, as shown in FIG. 1, or on the side of the supply output. In that case, the first detection device 21 would monitor a parameter of the secured supply power. However, a combination of a connection of the detection device 21 to the side of the supply input and the side of the supply output is conceivable, as well. In the same way, a separate first detection device 21 for both sides may be connected to the supply line 18. The parameter detected by the first detection device 21 may e.g. be an electrical current, an electrical voltage, a time-dependent development of the electrical current or of the electrical voltage or a time duration within which the first switching element 19 limits an electrical current. An electrical current may e.g. be limited or, respectively, regulated by a first switching element 19 embodied as a transistor. As soon as the parameter is outside of a predetermined value range, the control unit 20, within the framework of securing, electrically disconnects the supply input 80 and the first supply output 81 from each other and in this manner secures the secured supply energy relayed via the first supply output 81.

A parameter detected by the first detection device 21 may e.g. also be a combination of an electrical current and an electrical voltage. In this case, the parameter detected by the first detection device 21 corresponds to the electrical power. If e.g. an electrical power amounting to 0 VA to 48 VA is predetermined as a value range, and the first detection device 21 detects an electrical power amounting to 49 VA, the control unit 20 electrically disconnects the supply input 80 and the first supply output 81 by the first switching element 19 within the framework of securing, and in this manner secures the supply power relayed via the first supply output 81.

A parameter detected by the first detection device 21 may e.g. be a combination of an electrical current and a time-dependent development of the electrical current. For example, it is possible that a value range based on a characteristic is predetermined in the control unit 20. A characteristic describes a switch-off behavior of the safety module 3 and may e.g. comprise a maximum electrical current or a maximum time duration within which a maximal electrical current is allowed to flow. A characteristic describing the switch-off behavior may thus particularly form the basis of the predetermined value range. The characteristic deposited in the control unit 20 e.g. comprises the information that an electrical current amounting to 5A may at most flow for a time period of one millisecond. If, however, a constant electrical current at 5A is detected by the first detection device 21 for a time period of more than one millisecond, the control unit 20 electrically disconnects the supply input 80 and the first supply output 81 by the first switching element 19 within the framework of securing, and in this manner secures the supply power relayed via the first supply output 81.

A parameter detected by the first detection device 21 may e.g. be a combination of a time-dependent development of the electrical current and a time-dependent development of the electrical voltage. If, for example, a capacitive load is connected to the first supply output 81 as a consumer and said capacitive load is subsequently switched on, a switch-on current reaches a maximum current value at the beginning of the switch-on process whereas a switch-on voltage has a voltage value of 0V at the beginning of the switch-on process. In the course of the switch-on process, the value of the electrical current continuously decreases until a current-operation value is reached at which the capacitive load is operated, whereas the electrical voltage continuously increases up to a voltage-operation value at which the capacitive load is operated. By detecting the time-dependent development of the electrical current and the time-dependent development of the electrical voltage by the first detection device 21, e.g. a switching on of a connected capacitive load may be recognized and tolerated depending on the value range predetermined by the control unit 20. In this case, the control unit 20 would not electrically disconnect the supply input 80 and the first supply output 81 with the first switching element 19.

The signal module 10 comprises a further supply input 85 embodied to feed in the secured supply power and a further supply output 86 for relaying the secured supply power to the consumer 3. In order to actuate the consumer 3, the signal module 10 comprises a further control unit 22. The further control unit 22 is electrically connected to the field-bus-power-supply line 95 and may thus be supplied with the field-bus power for operation. The further control unit 22 is connected to a further switching element 23 for actuating the controller 3 and embodied to connect the consumer 3 to the field-bus system 7. The further switching element 23 is also embodied to switch the further supply output 86.

Figure 3:
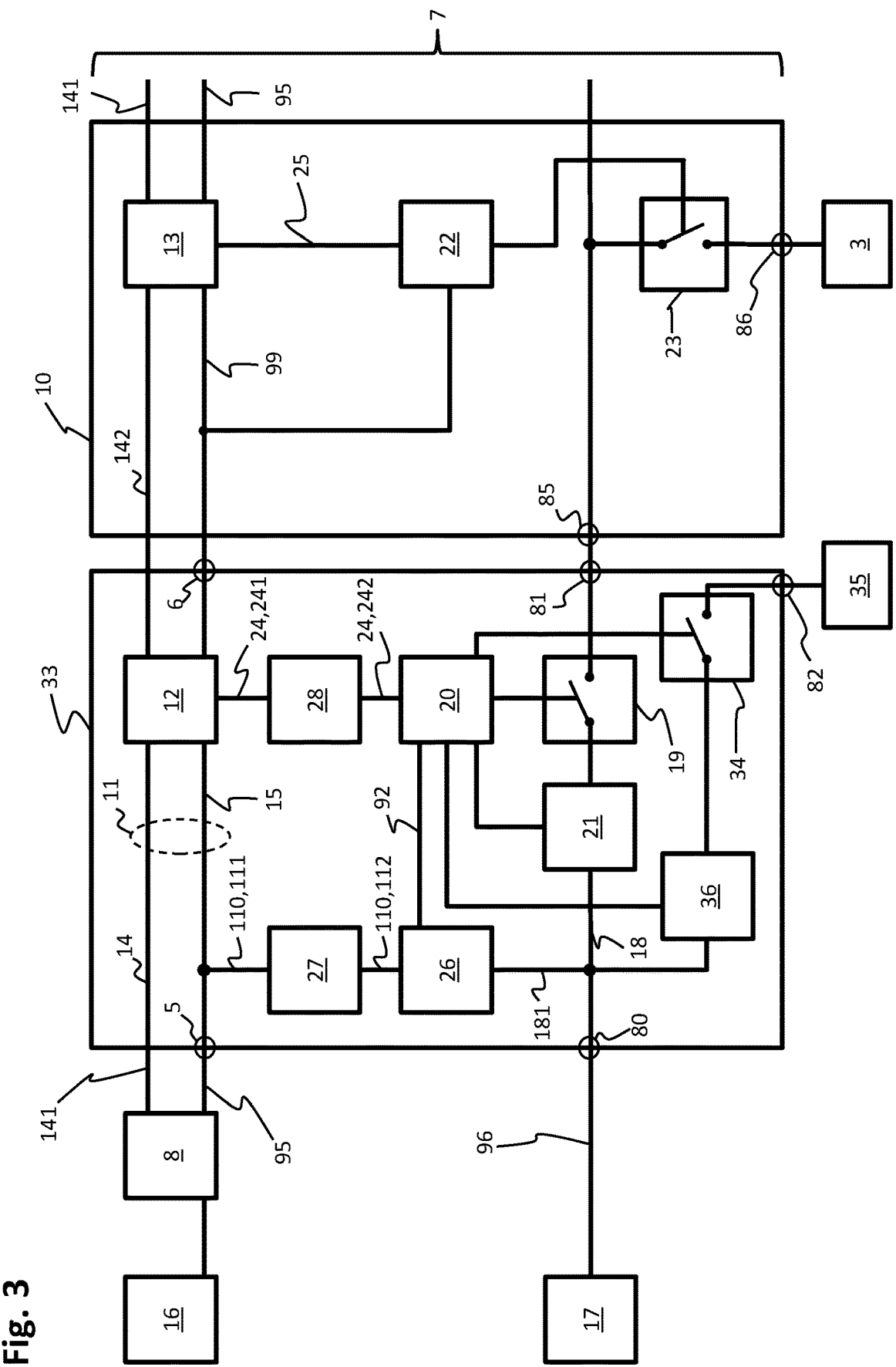
FIG. 3 shows a field-bus system comprising a safety module according to a second embodiment.

The control unit 20 and the further control unit 22 may also be referred to as microcontrollers. In the depiction of FIG. 1 and FIG. 3, the switch-on unit 12 and the further switch-on unit 13 as well as the control unit 20 and the further control unit 22 are shown as separate elements of the safety module 9 and of the signal module 10. However, this is not obligatory. The control unit 20 may comprise the switch-on unit 12 whereas the further control unit 22 may comprise the further switch-on unit 13.

The control unit 20 is connected to the switch-on unit 12 via a data line 24. As a result, an exchange of field-bus data between the control unit 20 and the superordinate field-bus terminal 8 is enabled. However, it is also possible to exchange field-bus data between the control unit 20 and any desired other subscribers of the field-bus system 7, i.e. of further field-bus subscribers. The control unit 20 may e.g. exchange an information relating to the securing of the first supply output 81 with the superordinate field-bus subscriber 8 by the exchange of field-bus data via the switch-on unit 12. The information relating to the securing of the first supply output 81 may e.g. be an electrical voltage detected by the first detection device 21, a detected electrical current, a detected time-dependent development of the electrical voltage or of the electrical current, a switching state of the first switching element 19 or a time duration monitored by the control unit 20, during which time duration the first switching element 19 limits an electrical current, said information being relayed to the superordinate field-bus subscriber 8 by the control unit 20. However, it may also be the case that the control unit 20 is embodied to receive the information relating to the securing from the superordinate field-bus subscriber 8. In this case, the information relating to the securing of the first supply output 81 may be a predetermined value range of an electrical voltage, of an electrical current, of a time-dependent development of the electrical voltage or of the electrical current or a time period, within which the first switching element 19 limits the electrical current. These lists are not complete so that a further information relating or not relating to the securing of the first supply output 81 may be exchanged between the superordinate field-bus subscriber 8 and the control unit 20.

The further control unit 22 is connected to the further switch-on unit 13 via a further data line 25. As a result, an exchange of field-bus data between the further control unit 22 and the superordinate field-bus subscriber 8 is enabled. However, an exchange of field-bus data between the further control unit 22 and any desired other subscribers of the field-bus system 7, i.e. further field-bus subscribers, is possible, as well. The further control unit 22 may e.g. exchange an information relating to the actuation of the consumer 3 with the superordinate field-bus subscriber 8 by the exchange of field-bus data via the further switch-on unit 13.

The safety module 9 furthermore comprises a supply module 26. The supply module 26 is embodied to provide an operating power for an operation of the control unit 20. For this purpose, the supply module 26 is connected to the control unit by an operating-power-supply line 92. In order to provide the operating power, the supply module 26 is connected to the supply line 18 via a supply-power-connecting line 181 and to the field-bus-power line 15 via a field-bus-power-connecting line 110. The supply module 26 is embodied to generate the operating power either from the supply power or from the field-bus power. The supply module 26 may e.g. be embodied to generate the operating power for the control unit 20 from the supply power. If the supply power is outside of a predetermined supply-power-value range, the supply module 26 may generate the operating power from the field-bus power. Hence, the supply module 26 may use a part of the field-bus power as an alternative to the supply power in order to operate the control unit 20. Typically, an operating power necessary for operating the control unit 20 may have an electrical direct voltage amounting to 3.3V.

Due to the fact that the supply module 26 is not only connected to the supply line 18 but to the field-bus-power line 15, as well, it is advisable to galvanically disconnect the field-bus-power line 15 and the supply line 18. Moreover, the control unit 20 is connected to the supply line 18 via the supply module 26 and to the field-bus-power line 15 via the switch-on module 15. Also with regard to this, it makes sense to galvanically separate the field-bus-power line 15 and the supply line 18. In order to galvanically disconnect the field-bus-power line 15 and the supply line 18, the safety module 9 comprises a first isolation device 27 and a second isolation device 28. The first isolation device 27 is switched between the field-bus-power input 5 and the supply module 26 in the field-bus-power-connecting line 110. The field-bus-power-connecting line 110 thus comprises a first section 111 and a second section 112. The first isolation device 27 galvanically disconnects the first section 111 and the second section 112 of the field-bus-power-connecting line 110.

In the data line 24, the second isolation device 28 is switched between the switch-on unit 12 connected to the field-bus-power line 15 and the control unit 20 connected to the supply module 26. The data line 24 thus comprises a first section 241 and a second section 242. The second isolation device 28 galvanically disconnects the first section 241 and the second section 242 of the data line 24 from each other. In this manner, the switch-on unit 12 is galvanically disconnected from the control unit 20, as well. In this way, data transmission or, respectively, communication is galvanically disabled.

Due to a galvanic disconnection of the first and the second section 111, 112 of the field-bus-power-connecting line 110 and due to a galvanic disconnection of the first and the second section 241 of the data line 24, the supply line 18 and the field-bus-power-connecting line 18 are galvanically disconnected. In this manner, the power supply is galvanically disconnected. In this way, transmission of interference signals may be prevented between the supply-power line 18 and the field-bus-power line 15. In particular, in this manner the field-bus-power line 15 is galvanically disconnected from the operating-power line 92 which may prevent transmission of interference signals between the field-bus-power line 15 and the operating-power line 92. The supply-power line 18 and the communication channel 14, 141, 142 are galvanically disconnected, as well. Thereby, a transmission of interference signals between the supply-power line 18 and the communication channel 14, 141, 142, over which an exchange of field-bus data may take place, may be prevented. Thus, in total, the supply-power line 18 and the field bus 11 are galvanically disconnected from each other.

The first isolation device 27 and/or the second isolation device 28 may e.g. be digital isolators, optical couplers, capacitive couplers or inductive couplers. By galvanically disconnecting the supply line 18 or, respectively, the operating power line 92 and the field-bus-power line 15, transmission of interference signals to the field bus 11 may be prevented. However, the first isolation device 27 and/or the second isolation device 28 may also be omitted.

Figure 2A:
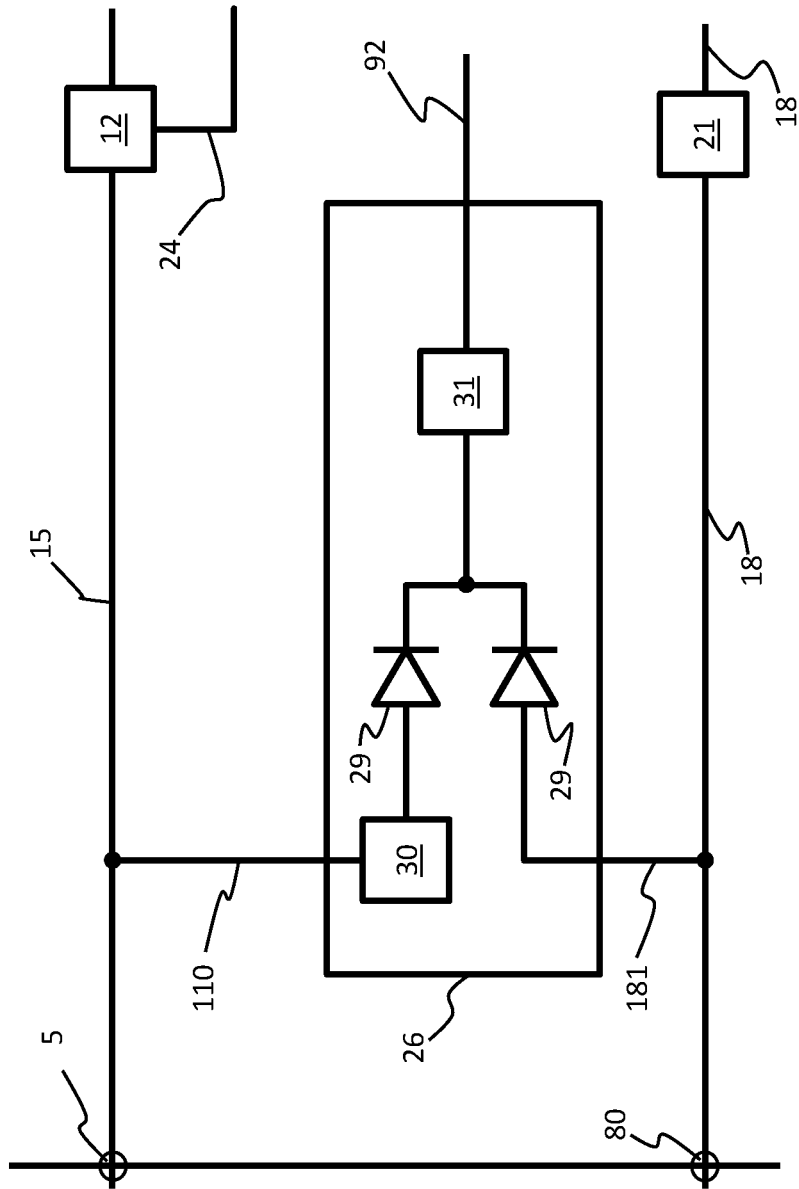
FIG. 2A depicts a first embodiment of a supply module of the safety module.
Figure 2B:
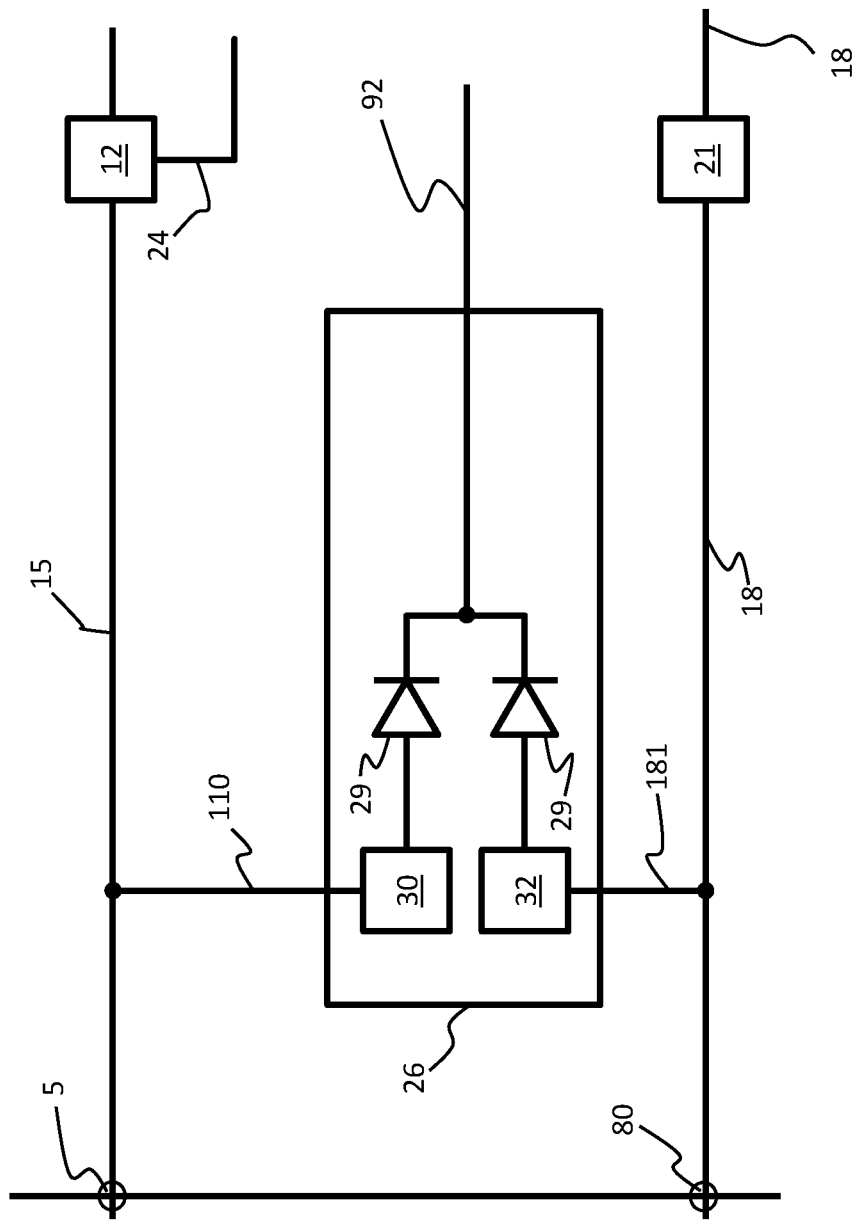
FIG. 2B shows a second embodiment of a supply module of the safety module.

FIG. 2A schematically depicts a first embodiment of the supply module 26. FIG. 2B schematically shows a second embodiment of the supply module 26. In both cases, the supply module 26 is electrically connected to the field-bus-power input 5 by the field-bus-power line 15 and the field-bus-power-connecting line 110 for feeding in the field-bus power and electrically connected to the supply input 80 by the supply line 18 and the supply-power-connecting line 181 for feeding in the supply power.

As the supply module 26 is generally embodied to generate the operating power for the control unit 20 either from the field-bus power or from the supply energy, the embodiments of the supply module 26 shown in FIG. 2A and FIG. 2B comprise an OR circuit. Said OR circuit may be based on two diodes 29, as is exemplarily depicted in FIG. 2A or 2B. The person skilled in the art knows further alternative implementations of an OR circuit. The diodes 29 are embodied to either let through the field-bus power provided via the field-bus-power line 15 or, respectively, an intermediate power based on the field-bus power or the supply power provided via the supply line 18. As described, the field-bus power and/or the supply power may be a direct voltage. The direct voltage provided via the field-bus-power line 15 may also be referred to as field-bus voltage. The direct voltage provided via the supply line 18 may also be referred to as supply voltage. The field-bus voltage may be seen as a parameter of the field-bus power and e.g. correlate with the field-bus power. The supply voltage may be seen as a parameter of the supply power and e.g. correlate with the supply power. The diodes 29 either let through the field-bus voltage or, respectively, a first intermediate voltage based on the field-bus voltage or the supply voltage, depending on the amounts of the voltages, whereby in all cases only the highest voltage is let through. An operating voltage generated by the first embodiment of the supply module 26 may also either be generated from the field-bus voltage or, respectively, from the first intermediate voltage based on the field voltage or from the supply voltage. The operating voltage may be seen as a parameter of the operating power and e.g. correlate with the operating power.

Apart from the first embodiment of the supply module 26, FIG. 2A shows the field-bus-power input 5, the field-bus-power line 15, the field-bus-power-connecting line 110, the switch-on unit 12, the data line 24, the supply input 80, the supply line 18, the supply-power-connecting line 181, the operating-power line 92 and the first detection device 21 of the first embodiment of the safety module 9. For the sake of clarity, further components such as the first isolation device 27 have been depicted in FIG. 1.

The first embodiment of the supply module 26 provides the operating voltage for the control unit 20 with a first converter 30 electrically connected to the field-bus-power line 15 via the field-bus-power-connecting line 110 and with a second converter 31 electrically connected to the control unit 20 connecting up to the diodes 29 on the output side. For this purpose, the field-bus voltage is converted by the first converter 30 so that the first intermediate voltage is based on the field-bus voltage. The first converter 30 may e.g. be embodied to convert the field-bus voltage of 5V into a first intermediate voltage of 10V. Thus, the first converter 30 acts as an upwards converter and may e.g. be embodied as a so-called charge pump. As the supply voltage typically amounts to 24V, the supply voltage is in this case let through by the OR circuit comprising the diodes as the supply voltage is higher than the first intermediate voltage. The second converter 31 may thus convert the applied supply voltage into the operating voltage that typically amounts to 3.3V. The second converter 31 correspondingly acts as a downwards converter. If the supply voltage fails or if it is below the first intermediate voltage of 10V generated by the first converter 30, the first intermediate voltage generated by the first converter 30 is let through by the OR circuit and is converted into the operating voltage by the second converter 31. The first converter 30 thus at first increases the field-bus voltage so that the second converter 31 is able to generate the operating voltage. If the second converter 31 only received the field-bus voltage, the field-bus voltage might not be sufficient to generate the operating voltage. For example, it may occur that the second converter 31 requires an input voltage of at least 5.6V in order to generate the operating voltage of 3.3V. At an output of the first embodiment of the supply module 26, the operating voltage is provided to the control unit 20 via an operating-power line 92.

FIG. 2B schematically depicts a second embodiment of the supply module 26. The electrical connection of the supply module 26 according to the second embodiment to the field-bus-power line 15, the supply line 18 and the operating-power line 92 is carried out in analogy to the connection of the supply module 26 according to the first embodiment depicted in FIG. 2A. In order to avoid repetitions, this is not described again.

Apart from the second embodiment of the supply module 26, FIG. 2B depicts the field-bus-power input 5, the field-bus-power line 15, the field-bus-power-connecting line 110, the switch-on unit 12, the data line 24, the supply input 80, the supply line 18, the supply-power-connecting line 118, the operating-power line 92 and the first detection device 21 of the first embodiment of the safety module. For clarity's sake, further components such as the first isolation device 27 have been depicted in FIG. 1.

The second embodiment of the supply module 26 provides the operating voltage for the control unit 20 with the first converter 30 electrically connected to the field-bus-power line 15 via the field-bus-power-connecting line 110 and with a third converter 32 electrically connected to the supply line 18 via the supply-power-connecting line 181. The first converter 30 is embodied to convert the field-bus voltage into a first intermediate voltage, as already described with regard to the first embodiment of the supply module 26. The third converter 32 is embodied to convert the supply voltage into a second intermediate voltage. The first intermediate voltage of the first converter 30 and the second intermediate voltage of the third converter 32 may have differing values. For example, the first converter 31 may provide a first intermediate voltage of 3.0V and the third converter 32 may provide a second intermediate voltage of 3.3 V. The OR circuit may be based on two diodes 29, as is exemplarily depicted in FIG. 2B. The diodes 29 are embodied to let through either the first intermediate voltage based on the field-bus power or the second intermediate voltage based on the supply power as the provided operating voltage for the control unit 20. In this case, the second converter 31 shown in FIG. 2A becomes redundant as the first converter 30 and the third converter 32 likewise generate an operating voltage usable by the control unit 20 that is correspondingly provided to the control unit 20. At an output of the second embodiment of the supply module 26, the operating voltage is provided to the control unit 20 by an operating-power line 92.

In a further embodiment, the first converter 30, the second converter 31 and the third converter 32 may be jointly used in a circuit. The embodiment would in this case be a combination of the first and second embodiment of the supply module 26.

Depending on the respective application, the first converter 30, the second converter 31 and/or the third converter 32 may be implemented as upwards or, respectively, downwards converters. If e.g. the supply power is an alternating voltage, e.g. the third converter 32 may be embodied to additionally convert an alternating voltage into a direct voltage.

FIG. 3 schematically depicts a field-bus system 7 comprising a safety module 33 according to a second embodiment. The second embodiment of the safety module 33 and the first embodiment of the safety module 9 are essentially designed in the same manner. A plurality of elements of the first and of the second embodiment are almost identical and have the same reference numeral. In the following description of figures, only the differences between the second embodiment of the safety module 33 and the first embodiment of the safety module 9 are explained.

The safety module 33 of the second embodiment comprises, apart from the first switching element 19, a second switching element 34 that is connected to the control unit 20. The control unit 20 is embodied to address the first switching element 19 and the second switching element 34 independently from each other. The second switching element 34 is embodied to electrically connect or to electrically disconnect the supply input 80 and a second supply output 82 of the safety module 33. The second supply output 82 is e.g. embodied for relaying the supply power as a secured supply power to a further consumer 35, as shown in FIG. 3. The second supply output 82, however, may also be embodied to relay the supply power to the consumer 3. The second switching element 34 may e.g. be an electronic switching element. An electronic switching element may e.g. consist of a transistor or a plurality of connected transistors. The transistor may e.g. be a MOSFET (metal-oxide-semiconductor field-effect transistor). In this case, the supply input 80 is electrically connected to a drain electrode and the second supply output 82 is electrically connected to a source electrode of the transistor.

The control unit 20 is embodied to secure the relaying of the supply power as secured supply power via the second supply output 82. In order to secure the second supply output 82, the control unit 20 is connected to a second detection device 36 connected to the supply line 18 and monitors a further parameter of the supply power. The further parameter detected by the second detection device 36 and monitored by the control unit 20 may be different from or identical to the parameter that is detected by the first detection device 21 and monitored by the control unit 20. The second detection device 36 may be connected to the supply line 18 either on the side of the supply input, as shown in FIG. 3, or on the side of the supply output. In that case, the second detection device 36 would monitor a parameter of the secured supply power. However, a combination of a connection of the second detection device 36 on the supply-input side and the supply-output side is conceivable, as well. Likewise, a separate second detection device 36 comprising the supply line 18 may be connected for both sides. The further parameter detected by the second detection device 36 may e.g. be an electrical current, an electrical voltage, a time-dependent development of the electrical current or of the electrical voltage or a time duration within which the second switching element 34 limits an electrical current. An electrical current may e.g. be limited by a second switching element 34 embodied as a transistor. As soon as the further parameter lies outside of a further predetermined value range, the control unit 20 electrically disconnects the supply input 80 and the second supply output 82 with the second switching element 34, within the framework of securing, and in this way secures the supply power relayed via the second supply output 82.

A further parameter detected by the second detection device 36 may e.g. also be a combination of an electrical current and an electrical voltage. In that case, the further parameter detected by the second detection device 36 corresponds to the electrical power. If, for example, an electrical power amounting to 0 VA to 48 VA is predefined as a further value range, and the second detection device 36 detects an electrical power amounting to 49 VA, the control unit electrically disconnects the supply input 80 and the second supply output 82 with the second switching element 34 within the framework of securing, and in this manner secures the secured supply power relayed via the second supply output 82.

A further parameter detected by the second detection device 36 may e.g. be a combination of an electrical current and a time-dependent development of the electrical current. For example, it is assumed that a value range based on a characteristic is predefined in the control unit 20. A characteristic describes a switch-off behavior of the safety module 33 and may e.g. comprise a maximum electrical current or a maximum electrical time period within which a maximum electrical current may flow. A characteristic describing the switch-off behavior may thus particularly form the basis for the further predetermined value range. The characteristic deposited in the control unit 20 e.g. comprises the information that an electrical current amounting to 5A must not flow longer than for a millisecond. If a constant electrical current amounting to 5A is detected over a time duration of a millisecond by the second detection device 36, the control unit 20 electrically disconnects the supply input 80 and the second supply output 82 with the second switching element 34 within the framework of securing, and in this manner secures the secured supply power relayed via the second supply output 82.

A further parameter detected by the second detection device 36 may e.g. be a combination of a time-dependent development of the electrical current and a time-dependent development of the electrical voltage. If e.g. a capacitive load is connected to the second supply output 82 as a further consumer 35 and said capacitive load is subsequently switched on, the switch-on current reaches a maximum current value at the beginning of the switch-on process whereas a switch-on voltage has a voltage value of 0V at the beginning of the switch-on process. In the course of the switch-on process, the current value of the electrical current continuously decreases up to a current-operating value at which the capacitive load is operated, whereas the electrical voltage continuously increases up to a voltage-operating value at which the capacitive load is operated. By detecting the time-dependent development of the electrical current and the time-dependent development of the electrical voltage by the second detection device 36, e.g. a switching on of a connected capacitive load may be recognized and tolerated by the control unit 20 depending on the further predetermined value range. In this case, the control unit 20 would not electrically disconnect the supply input 80 and the second supply output 82 with the second switching element 34.

The control unit 20 may e.g. exchange an information relating to the securing of the second supply output 82 by the exchange of field-bus data via the switch-on unit 12, using the superordinate field-bus sub scriber 8.

The control unit 20 is also embodied to switch the first switching element 19 and the second switching element 34 with a time offset. This may e.g. be appropriate if a high electrical current flowed via the first supply output 81 and via the second supply output 82 at the same time.

The safety module 33 according to the second embodiment may also comprise a plurality of switching elements that are embodied like the first switching element 19 and the second switching element 34. Accordingly, the switching module 33 may comprise a plurality of detection devices 21, 36.

Figure 4:
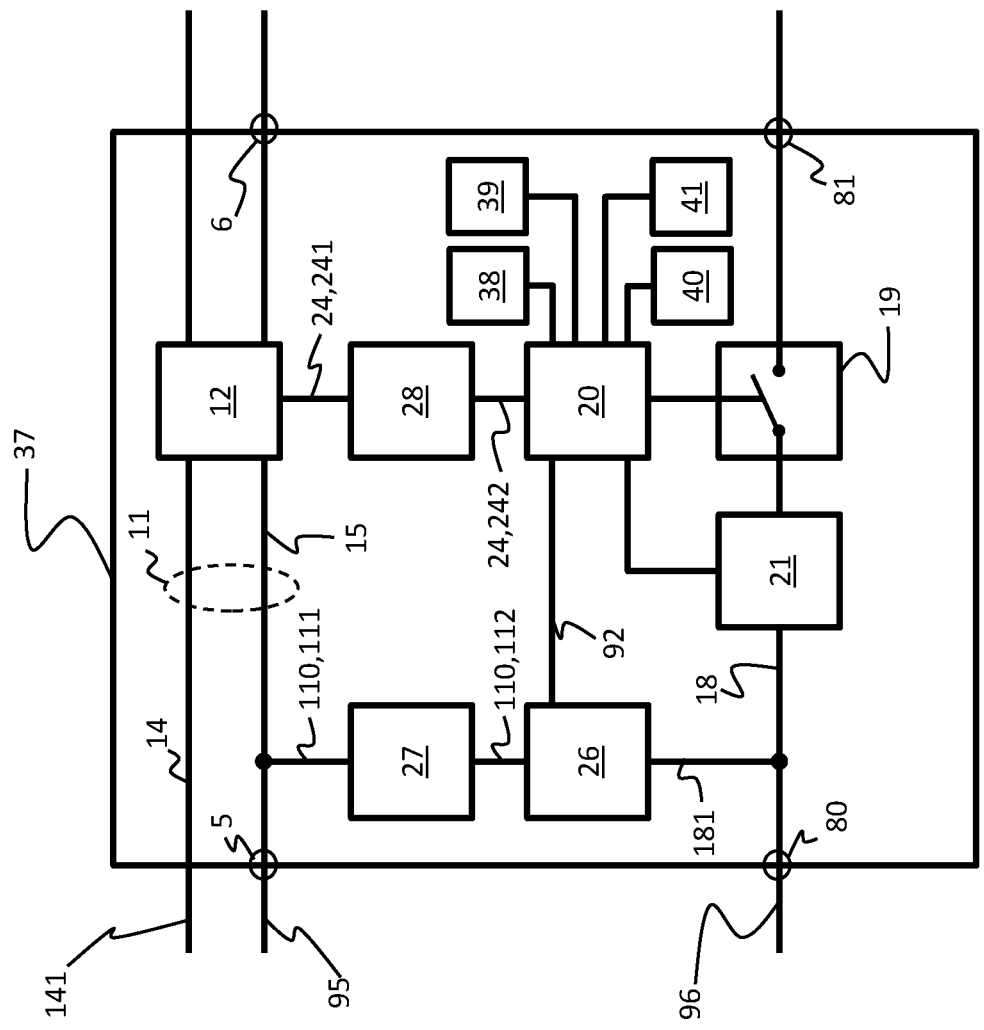
FIG. 4 depicts a safety module according to a third embodiment.

FIG. 4 schematically depicts a safety module 37 according to a third embodiment. The third embodiment of the safety module 37 and the first embodiment of the safety module 9 are essentially designed identically. A plurality of elements of the third and of the first embodiment 9, 37 are almost identical and have the same reference numerals. In the following figure description, only the differences between the third embodiment of the safety module 37 and the first embodiment of the safety module 9 are explained.

In case of the safety module 9 according to the first embodiment as well as in case of the safety module 33 of the second embodiment, as well as in case of the safety module 37 according to the third embodiment, it is possible to activate, i.e. to switch on, the securing function of the safety module 9, 33, 37 with the control unit 20, and also to deactivate it, i.e. to switch it off. During switch-on, an electrical connection is established between the supply input 80 and the first supply output 81 and/or the second supply output 82 via the first switching element 19 and/or the second switching element 34 accordingly addressed by the control unit 20. Simultaneously or previously, the control unit starts to monitor the parameter to ascertain whether it is in the predetermined value range. Thus, a securing function is provided. When switching off, an electrical connection between the supply input 80 and the first supply output 81 and/or the second supply output 82 is disconnected by the first switching element 19 and/or the second switching element 34 accordingly addressed by the control unit 20. Subsequently, the control unit terminates the monitoring of the parameter. Alternatively, monitoring may be continued.

Furthermore, it is possible to deposit, to determine and/or to adapt the manner, the scope and the value ranges of the parameters detected by the first detection device 21 and/or of the second detection device 36 and monitored by the control unit 20 in the control unit. In this way, the control unit 20 or, respectively, the safety module 9, 33, 37 may be set.

In addition, it is possible to reset the first switching element 19 and/or the second switching element 34 with the control unit 20, i.e. to re-establish an electrical connection between the supply input 80 and the first supply output 81 and/or the second supply output 82 provided that the electrical connection was previously disconnected due to the securing function of the safety module or due to a corresponding previous setting. Said reset may either be carried out due to a corresponding reset signal to the control unit 20 or e.g. after expiry of a predetermined or variable time span. If after the reset, the detected parameter is still outside of a predefined value range, the securing function would, as explained above in detail, effect a renewed disconnection of the electrical connection. When resetting the safety module 9, 33, 37, it may happen that a cooling phase of the first switching element 19 and/or of the second switching element 34 has to be waited for before the securing function of the safety module 9, 33, 37 can be switched on again.

The safety module 37 according to the third embodiment comprises two sensors 38, 39 electrically connected to the control unit 20 and operable from outside of the safety module 37, as well as two digital inputs 40, 41 electrically connected to the control unit 20 and chargeable with data from outside of the safety module 37. For clarity's sake, individual connections of the two sensors 38, 39 and of the two digital inputs 40, 41 to an outer side of the safety module 37 according to the third embodiment are shown in FIG. 5A.

A first sensor 38 may e.g. be provided to manually switch on or off the safety module 37, to reset it, to set the parameter or value range to be monitored and/or to retrieve the parameter or value range to be monitored. In order to set the parameter or value range to be monitored, the safety module may e.g. be set to a so-called programming mode e.g. by a continuous actuation of the first sensor 38 over a predefined time duration, e.g. over three seconds. Subsequently, a currently set parameter or value range is displayed by a defined sequence of a plurality of visual and/or acoustic signals. For this purpose, a light source is e.g. assigned to the first sensor 38. One parameter may e.g. be a nominal current of the consumer. For example, a sequence of three flashes-break-three flashes may mean that a nominal current of 3 A is currently set as a parameter to be monitored. In order to adapt or, respectively, set it, the first sensor 38 is actuated so often until the described parameter or value range to be monitored is set. If, for example, the first sensor 38 was actuated five times in the programming mode, e.g. a nominal current of 5 A would be newly set as a parameter to be monitored. Accordingly, the light source would signal this new setting as follows: five flashes-break-five flashes. The programming mode may then be exited by renewed continuous actuation of the first sensor 38 over a predefined time period, e.g. 3 seconds, and the newly set parameter or value range to be monitored is taken over. Alternatively, the programming mode is exited if the sensor 38 is not actuated over an extended predefined time period, e.g. 30 seconds. In order to retrieve the set parameter or value range to be monitored, the safety module may e.g. be set to a so-called retrieval mode by continuously actuating the first sensor 38 over a predefined time period, e.g. 3 seconds. Subsequently, a set parameter or value range is displayed by a predefined sequence of a plurality of visual and/or acoustic signals. For this purpose, e.g. a light source is assigned to the first sensor 38. One parameter may e.g. be a nominal current of the consumer. For example, a sequence of three flashes-break-three flashes may signify that a nominal current amounting to 3A has been set as a parameter to be monitored. The retrieval mode may be exited via renewed continuous actuation of the first sensor 38 over a predefined time period, e.g. over 3 seconds. Alternatively, the retrieval mode is exited if no actuation of the first sensor 38 has taken place over an extended predefined time period such as 30 seconds.

Instead of switching on or, respectively, off the safety module 37 using the first sensor 38, resetting, setting the parameter or value range to be monitored and/or retrieving the parameter or value range to be monitored, a first external sensor or switch may be provided for switching on or, respectively, off, resetting, setting the parameter or value range to be monitored and/or retrieving the parameter or value range to be monitored, the external sensor or switching being connected to a first digital input 40 in a data-technical manner. Also a combination of a first sensor 38 and a first external sensor or switch in connection with the first digital input 40 may be provided for switching on or, respectively, off, resetting, setting and/or retrieving the safety module 37.

A second sensor 39 of the safety module 37 may e.g. be provided alternatively or additionally in order to manually switch the safety module 37 on or, respectively, off, to reset it, to set the parameter or value range to be monitored and/or to retrieve the parameter or value range to be monitored. In order to set the parameter or value range to be monitored, the safety module may be put into a so-called programming mode by continuously actuating the second sensor 39 over a predefined time period such as 3 seconds. Subsequently, a currently set parameter or value range is displayed by a defined sequence of a plurality of visual and/or acoustic signals. For this purpose, a light source may e.g. be assigned to the second sensor 39. One parameter may e.g. be a nominal current of the consumer. For example, a sequence of three flashes-break-three flashes may mean that a nominal current of 3 A is currently set as a parameter to be monitored. In order to adjust or, respectively, set said parameter, the second sensor 39 is actuated often enough until the desired parameter or value range to be monitored is set. If, for example, the second sensor 39 was to be actuated five times in the programming mode, e.g. a nominal current of 5 A would be newly set as a parameter to be monitored. Accordingly, the light source would then signal said new setting in the following manner: five flashes-break-five flashes. The programming mode may be exited by renewed continuous actuation of the second sensor 39 over a predefined period of time, such as 3 seconds, and the newly set parameter or value range to be monitored is taken over. Alternatively, the programming mode is exited if no actuation of the sensor 39 takes place over an extended predefined time period, such as 30 seconds. In order to retrieve the set parameter or value range to be monitored, the safety module may be set to a so-called retrieval mode e.g. by continuously actuating the second sensor 39 over a predefined time period such as 3 seconds. Subsequently, a set parameter or value range is displayed by a defined sequence of a plurality of visual and/or acoustic signals. For this purpose, a light source is e.g. assigned to the second sensor 39. One parameter could e.g. be a nominal current of the consumer. For example, a sequence of three flashes-break-three flashes may signify that a nominal current of 3 A is set as a parameter to be monitored. The retrieval mode may be exited by renewed continuous actuating of the second sensor 39 over a predefined period of time, such as 3 seconds. Alternatively, the retrieval mode is exited if no actuating of the second sensor 39 takes place over an extended predefined time period, such as 30 seconds. In this case, it is also possible to provide an external second sensor or switch that is connected to a second digital input 41 of the safety module 37. Also, a combination of the second sensor 39 and the second external sensor or switch in connection with the second digital input 41 may be provided for switching on or, respectively off, resetting, setting and/or retrieving of the safety module 37. The safety module 37 may also comprise a plurality of switching elements. In this case, a corresponding number of sensors and/or digital inputs may be provided.

Switching on or, respectively, off, or resetting, or setting or retrieving of the safety module 37, however, may also be carried out via the field bus 11. With the field bus 11, the safety module 37 may e.g. be parametrized with regard to the nominal current or to under/over voltage. The safety module 37 may furthermore be used as a facility-monitoring device, i.e. e.g. a currently flowing electrical current, an applied voltage or an event may be indicated. The event may e.g. be a short circuit, an overload, an overvoltage, a subvoltage or an excess temperature, and e.g. be displayed by light-emitting diodes arranged at the safety module 37.

In addition, settings of the safety module 9, 33, 37 may be deposited in a so-called start-up list that may be stored in the switch-on unit 12 or in the control unit 20. Alternatively or additionally, the settings of the safety module or, respectively, the start-up list may be deposited in another field-bus module and/or a controller of the field-bus system 7. With each start of the field-bus system 7, the deposited settings are loaded. This has the advantage that in case of exchanging the safety module 9, 33, 37, the deposited settings may automatically be taken over so that it is not necessary to parametrize the safety module 9, 33, 37 again.

Figure 5B:
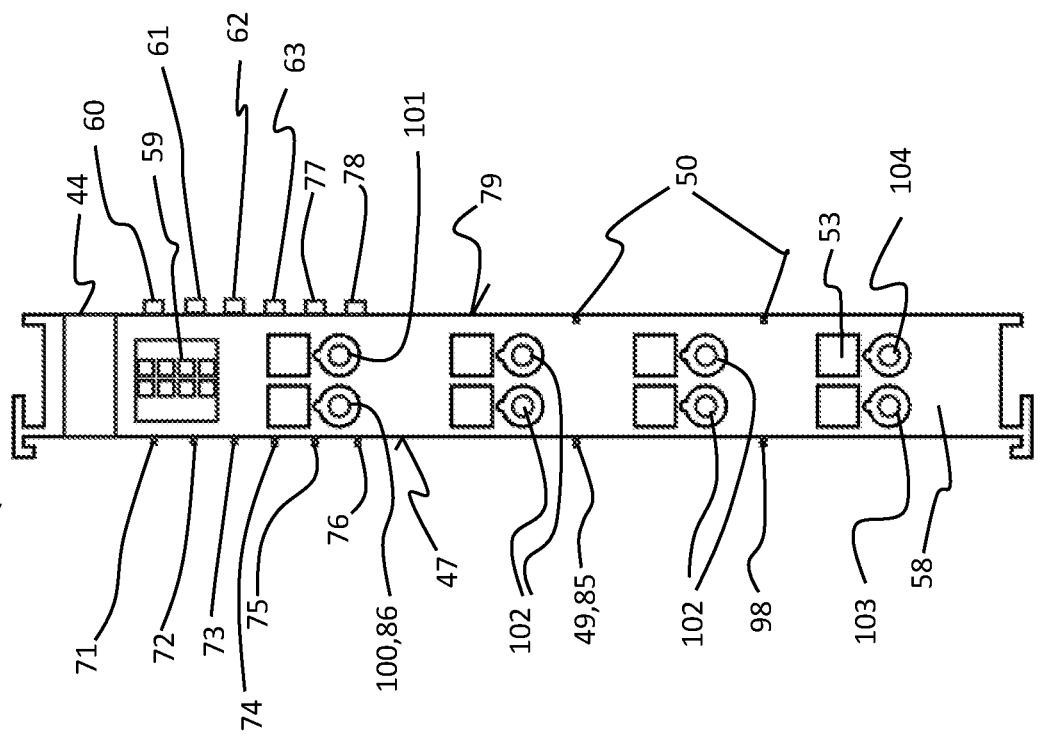
FIG. 5A is a front view of a safety module embodied as a bus terminal and FIG. 5B is a front view of a signal module embodied as a bus terminal.
Figure 5A:
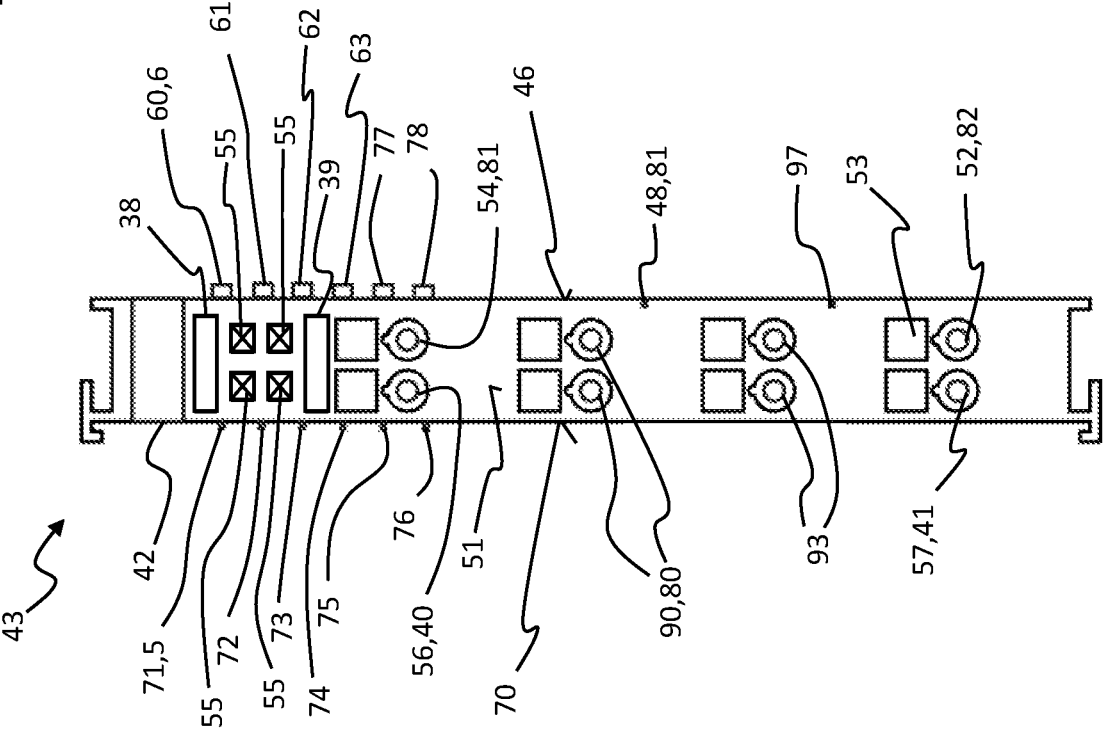

FIG. 5A shows a front view of a safety module 9, 33, 37 embodied as a bus terminal (or excess-current-protective terminal) 43 according to a second embodiment corresponding to the description of FIG. 3, and FIG. 5B shows a front view of a signal module 10 embodied as a bus terminal (or signal terminal) 45.

FIG. 6 shows a perspective view of the safety module 33 of FIG. 5A embodied as a bus terminal (or excess-current-protective terminal) 43. The features of the embodiment of the safety module 33 (or excess-current-protective terminal) 43 according to the second embodiment described in the following may, without further ado, be transferred to safety modules 9 according to the first embodiment, to safety modules 37 according to the third embodiment and/or to any other safety modules within the framework of the inventive idea.

The switch-on unit described in conjunction with FIG. 3, the control unit, the first switching element, the second switching element, the first detection device, the second detection device, the supply module, the first isolation device, the second isolation device, the data line, the supply line, the supply-connecting line, the field-bus-power line, the field-bus-power-connecting line and the operating-power line are arranged in a housing 42. The housing 42 and the elements of the safety module 33 arranged therein may be referred to as an excess-current-protective terminal 43. The further switch-on unit described in conjunction with FIG. 3, the further switching element and the further control unit are arranged in a further housing 44. The further housing 44 and the elements of the signal module 10 arranged therein may be referred to as signal terminal 45.

The housing 42 of the excess-current-protective terminal 43 comprises a side face 46. The further housing 44 of the signal terminal 45 comprises a further side face 47. The side face 46 is embodied to directly abut on the further side face 47 in an assembled state. This can e.g. be seen in FIGS. 7 and 8. The first supply output 81 of the safety module 33 for discharging a secured supply voltage is arranged at the side face 46 as a contact structure 48. In addition, a second contact structure 97 is embodied at the side face, e.g. forming a minus path or a 0V path or a ground path of the supply voltage. The further supply input 85 of the signal terminal 45 is embodied as a further contact structure 49 at the further side face 47. The contact structure 48 is embodied to directly abut on the further contact structure 49 in order to relay the secured supply power to the signal terminal 45. This embodiment of contact structures analogously applies to the second contact structure 97 and to a third contact structure 98 correspondingly arranged at the signal terminal 45. As a result, the safety module 33 or, respectively, the excess-current-protective terminal 43 may be connected up to the signal module 10 or, respectively, to the signal terminal 45. The excess-current-protective terminal 43 and the signal terminal 45 may also be connected up to the group of terminals.

In the depicted examples of FIGS. 5A and 5B, the contact structure 48 and the second contact structure 97 are embodied as two grooves whereas the further contact structure 49 and the third contact structure 98 are embodied as springs corresponding to the grooves. However, it is not required that the contact structure 48, the second contact structure 97, the further contact structure 49 and the third contact structure 98 are embodied according to the spring/groove principle. The contact structure 48, the second contact structure 97, the further contact structure 49 and the third contact structure 98 may e.g. also be embodied as plane electrical contacts embodied to abut on one another in order to relay secured supply power to the consumer.

The signal terminal 45 comprises an additional contact structure 50 at a third side face 79 opposite to the further side face 47 in the form of two grooves. In this manner, the secured supply power may be relayed to further signal terminals. The contact structures 48, 49, 50, 97, 98 embodied according to the spring/groove principle may also be referred to as power contacts. Due to the power contacts, a separate cable wiring in order to relay the supply power may be omitted.

The housing 42 comprises a front side 51 extending transversely to the side face 48. At the front side 51, two first contact elements 90 are embodied allowing for an electrical contacting of the safety module 33 by inserting a cable. The two first contact elements 90 are connected in an electrically conductive manner so that any random first contact element 90 may be used in order to wire the excess-current protective terminal 43. Thus, the first contact elements 90 form the supply input 80 for feeding in a supply power into the safety module 33.

Moreover, two second contact elements 93 are embodied at the front side, the contact elements 93 allowing for an electrical contacting of the safety module 33 by inserting a cable. The two second contact elements 90 are connected in an electrically conductive manner so that any random second contact element 93 may be used when wiring the excess-current protective terminal 43. The two second contact elements e.g. form the minus path or the 0V path or a ground path of the supply power.

Moreover, a third contact element 54 is embodied at the front side 51, forming the first supply output 81 for the secured supply power. The contact structure 48 and the third contact element 54 are electrically connected within the housing 42 in such a way that a user may randomly choose which kind of first supply output 81 they wish to use for their purposes.

In addition, a fourth contact element 52 is embodied at the front side 51, forming the second supply output 82 of the secured supply power. A fifth contact element 56 at the front side 51 forms a first digital input 40 for the safety module 33. The first external sensor may e.g. be connected to the fifth contact element 56 in a data-technical manner by wiring and thus, as described, reset e.g. the safety module 33 or, respectively, the securing function for the first supply output 81.

A sixth contact element 57 at the front side 51 forms the second digital input 41 for the safety module 33. The second external sensor may e.g. be connected to the sixth contact element in a data-technical manner by wiring and thus, as described, e.g. reset the safety module 33 or, respectively, the securing function for the second supply output 82.

The electrical connection and the mechanical attachment of the described cables in the individual first to sixth contact elements 52, 54, 56, 57, 90, 93 is e.g. carried out by a spring-force clamp or tension-spring clamp embodied in the individual first to sixth contact elements 52, 54, 56, 57, 90, 93 and also referred to as cage clamp.

An aperture 53 is respectively embodied above the first to sixth contact elements 52, 54, 56, 57, 90, 93. The aperture 53 is provided to receive a tool, e.g. a screwdriver. With said tool, the wiring of the respective first to sixth contact element 52, 54, 56, 57, 90, 93 or of the respective spring-force clamp may be unfastened.

At its front side, the excess-current protective terminal 43 comprises the two sensors 38, 39 described in detail in conjunction with FIG. 4 for switching on or off, resetting and/or setting. Likewise, light-emitting diodes 55 are arranged at the front side 51 in order to display information or events. Thus, e.g. a light-emitting diode 55 may visualize the switching state of the first or second switching element in a color code. Alternatively, it may be provided that one or both of the described sensors 38, 39 is/are embodied as a light-emitting sensor with an integrated illuminant, such as an LED. Such sensors are also referred to as LED sensors. If the sensors 38, 39 described in conjunction with FIG. 4 are embodied as LED sensors, information and events may also be displayed by the LED sensors. Thus, the first LED sensor 38 and/or the second LED sensor 39 may visualize the switching state of the first or of the second switching element with a color code. In this case, the light-emitting diodes 55 may be embodied to display further or, respectively, other information or events, such as a status of the field-bus communication.

At a second side face 70 opposite to the side face 46, six contact pins 71, 72, 73, 74, 75, 76 are embodied in the upper region. A first contact pin 71 forms the field-bus-power input 5 and a second contact pin 72 forms a minus path or a 0V path or a ground path of the field-bus-power supply of the field bus 11. A third contact pin 73, a fourth contact pin 74, a fifth contact pin 75 and a sixth contact pin 76 serve to contact the safety module 33 in a data-technical manner and form four individual input or, respectively, output channels of the part of the field bus 11 that is in total referred to as communication channel 14, 141, 142.

At the side face 46, six spring contacts 60, 61, 62, 63, 77, 78 are embodied in an arrangement corresponding to the first to sixth contact pins 71, 72, 73, 74, 75, 76. A first spring contact 60 forms the field-bus-power output 6 and a second spring contact 61 forms the minus path or 0V path or ground path of the field-bus-power supply of the field bus 11. A third spring contact 62, a fourth spring contact 63, a fifth spring contact 77 and a sixth spring contact 78 also serve to contact the safety module 33 in a data-technical manner and form four individual input or, respectively, output channels of the part of the field bus 11 in total referred to as communication channel 14, 141, 142.

The further side face 47 of the signal terminal 45 is embodied with regard to the forming of the first to sixth contact pins 71, 72, 73, 74, 75, 76 in analogy to the second side face 70 of the excess-current-protective terminal 43. Thus, the first contact pin 71 contacts the signal terminal 45 of the first spring contact 60 of the excess-current-protective terminal 43. The second contact pin 72 of the signal terminal 45 contacts the second spring contact 61 of the excess-current-protective terminal 43. The third contact pin 73 of the signal terminal 45 contacts the third spring contact 62 of the excess-current-protective terminal 43. The fourth contact pin 74 of the signal terminal 45 contacts the fourth spring contact 63 of the excess-current-protective terminal 43. The fifth contact pin 75 of the signal terminal 45 contacts the fifth spring contact 77 of the excess-current-protective terminal 43; and the sixth contact pin 76 of the signal terminal 45 contacts the sixth spring contact 78 of the excess-current-protective terminal 43. In total, a continuous field bus 11 is thus provided.

The third side 79 of the signal terminal 45 opposite to the further side 47 is embodied in analogy to the side face 46 of the excess-current-protective terminal 43 with regard to the forming of the first to sixth spring contacts 60, 61, 62, 63, 77, 78. The first spring contact 60 forms a field-bus-power output and the second spring contact 61 forms a minus path or 0V path or ground path of the field-bus-power supply of the field bus 11 of the signal terminal 45. The third spring contact 62, the fourth spring contact 63, the fifth spring contact 77 and the sixth spring contact 78 also serve to contact the signal terminal 45 in a data-technical manner and form four individual input or, respectively, output channels of the part of the field bus 11 in total referred to as communication channel 14, 141, 142.

The further housing 44 of the signal terminal 45 comprises a further front side 58 embodied transversely to the further side face 47. On the further front side 58, a seventh contact element 100 is formed. By inserting a cable, an electrical connection to the consumer is established by the seventh contact element 100 so that the seventh contact element 100 forms the further supply output 86 of the signal terminal 45 in order to supply the consumer with the secured supply power or, respectively, the secured supply voltage.

Furthermore, an eighth contact element 101, a ninth contact element 103 and a tenth contact element 104 are embodied at the further front side 58. These further three contact elements may form three further supply outputs of the signal terminal 45 in order to each supply three further consumers with the secured supply voltage.

In addition, four eleventh contact elements 102 are embodied at the further front side 58. By inserting a cable into each, the four eleventh contact elements 102 allow for an electrical contacting of the consumer and of the three further consumers. The four eleventh contact elements 102 e.g. form the minus path or 0V path or ground path of the supply voltage for the respective consumer.

The electrical connection and mechanical attachment of the described cables in the individual seventh to eleventh contact elements 100, 101, 102, 103, 104 is e.g. also carried out by a spring-force terminal or tensile-spring terminal also referred to as cage clamp and respectively embodied in the individual seventh to eleventh contact elements 100, 101, 102, 103, 104.

An aperture 53 is also embodied above the seventh to eleventh contact elements 100, 101, 102, 103, 104, respectively. The aperture 53 is provided to admit a tool, e.g. a screwdriver. Thereby, the wiring of the respective seventh to eleventh contact elements 100, 101, 102, 103, 104 or, respectively, of the respective spring-force terminal may be unfastened.

At the further front side 58 of the signal terminal 45, additional sensors and/or light-emitting diodes 59 may be embodied to display information, as indicated in FIG. 5B.

Figure 7:
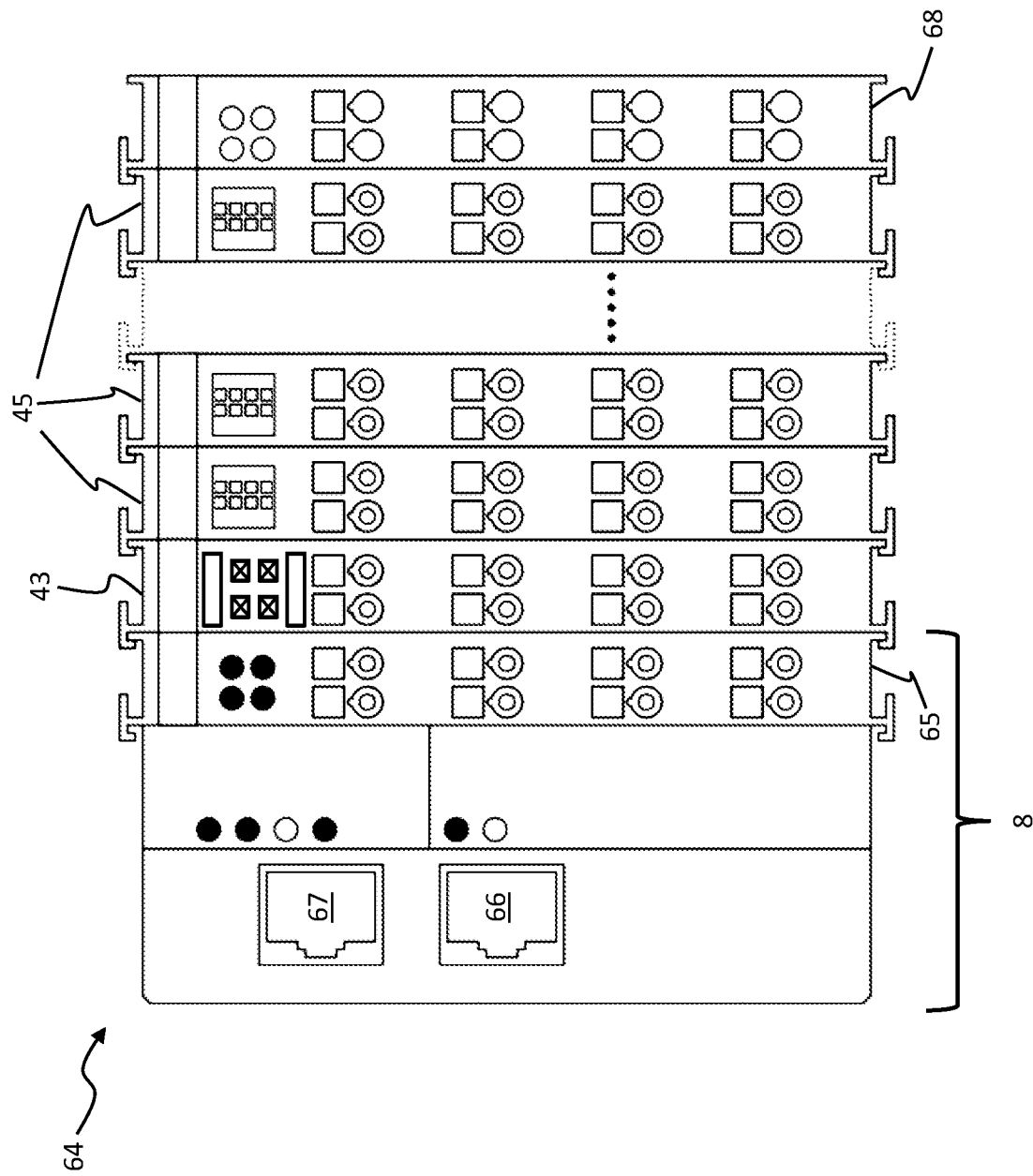
FIG. 7 shows a group consisting of a safety module and a plurality of signal modules.

FIG. 7 shows a group 64 comprising an excess-current-protective terminal 43 and a plurality of signal terminals 45.

The excess-current-protective terminal 43 is connected to a signal terminal 45 in an electrical and data-technical manner via the power contacts or, respectively, contact structures, the contact pins and the spring contacts described above in detail. A plurality of further signal terminals 45 is added to the signal terminal 45 connected to the excess-current-protective terminal 43 via power contacts or contact structures, contact pins and spring contacts. The plurality of signal terminals 45 is embodied to control a plurality of consumers.

The excess-current-protective terminal 43 is connected to the superordinate field-bus subscriber 8. The superordinate field-bus subscriber 8 comprises an initial terminal 65. The initial terminal 65 comprises, as described in conjunction with FIGS. 5A and 5B, first to sixth spring contacts at its side face that faces the excess-current-protective terminal 43. In this manner, the communication channel 14, 141, 142 and a field-bus-power channel of the field bus may be embodied between the initial terminal 65 and the excess-current-protective terminal 43. The initial terminal 65 is e.g. embodied to supply the superordinate field-bus subscriber 8 with electrical power. The superordinate field-bus subscriber 8 comprises two slots 66, 67 for field-bus cables. The field-bus cables may e.g. be cables having RJ-45 plugs. A slot 66 may e.g. be provided for the communication channel 14, 141, 42 whereas a further slot 67 is provided for a further communication channel. The field-bus cables may be connected to a control computer.

The group 64 of terminals ends with a final terminal 68. The final terminal 68 is e.g. embodied to lead back the communication channel 14, 141, 142 as a further communication channel. Alternatively, the final terminal 68 may be omitted provided that the last bus terminal in the group is embodied to correspondingly lead back the communication channel 14, 141, 142 as a further communication channel. In this case, the group 64 may close terminals with a protective cap for potentially uncovered contact structures.

Figure 8:
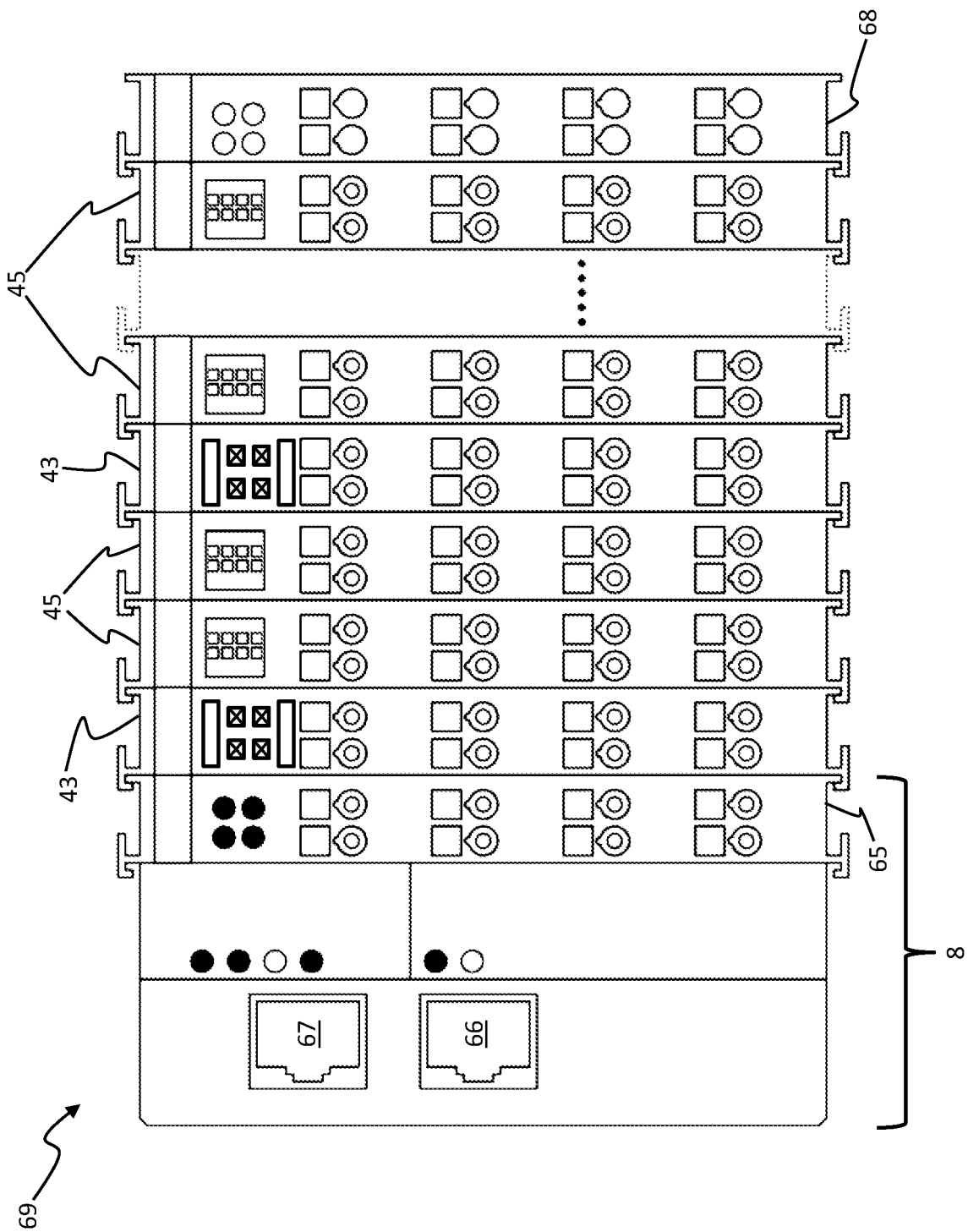
FIG. 8 depicts a group consisting of two safety modules and a plurality of signal modules.

FIG. 8 shows another group 69 having two excess-current-protective terminals 43 and a plurality of signal terminals 45.

Compared to the group 64 shown in FIG. 7, the further group 69 depicted in FIG. 8 comprises a further excess-current-protective terminal 43, that is embodied in the same manner as the excess-current-protective terminal 43. Between the excess-current-protective terminal 43 and the further excess-current-protective terminal 43, two signal terminals 45 are exemplarily connected. The further excess-current-protective terminal 43 may be required if the consumers connected to the field-bus system 7 via the two signal terminals 45 arranged between the excess-current-protective terminals 43 consume a maximum of a provided secured supply power. In that case, it is appropriate to arrange the further excess-current-protective terminal 43 in the group 69, because in this way a further supply power may be fed in and secured and be relayed to the additional consumer as a secured supply power.

It is also possible to switch on both excess-current-protective terminals 43 with a time offset. Two possibilities exist in order to do so. The first possibility of switching on the excess-current-protective terminals 43 with a time offset consists in the excess-current-protective terminal 43 generating a random number between 0 and 49 when applying the supply power. The result is then used for switching on the first supply output of the excess-current-protective terminal 43. If the result is e.g. 10, the supply output is switched on 10 ms later. The second supply output of the excess-current-protective terminal 43 is now switched on 50 ms after switching on the first supply output. The further excess-current-protective terminal 43 will generate a further random number that will generally differ from the first random number that will usually differ from the random number, so that the first supply output of the further excess-currentprotective terminal 43 can be switched on with a time offset with regard to the supply output of the excess-current-protective terminal 43, wherein the second supply output of the further excess-current-protective terminal 43 is again switched on after switching on the first supply output of the further excess-current-protective terminal 43.

The second possibility of switching on the excess-current-protective terminals 43 with a time offset consists in using identification numbers deposited in the control units 20 of two different excess-current-protective terminals 43 and unique to the respective control unit 20 in order to generate a number between 0 and 49. The identification number may e.g. have a width of 96 bit and be unique. The generated numbers will be used as switch-on time in ms for switching on the first supply outputs of the excess-current-protective terminals 43. The second supply outputs are switched on 50 ms after switching on the respective first supply outputs. The advantage of this procedure is that an excess-current-protective terminal 43 always generates the same number so that a potential problem in switching on can well be reproduced, thus facilitating an error search.

In an embodiment of a safety module 9, 33, 37, a plurality of series-connected switching elements may be embodied between a supply input 80 and a supply output 81, 82. Each series-connected switching element may e.g. be addressed independently from the control unit 20. As a result, it is advantageously possible to secure the first supply output 81 and/or the second supply output 82 in a redundant manner.

In an embodiment of a safety module 9, 33, 37, a plurality of series-connected detection devices may be embodied between the supply input 80 and a supply output 81, 82. Each series-connected detection device is e.g. embodied to detect a parameter of the supply power and/or a parameter of the secured supply power. As a result, it is advantageously possible to monitor a parameter of the supply power and/or a parameter of the secured supply power on several channels with the control unit 20 of the safety module 9, 33, 37.

In an embodiment of a safety module 9, 33, 37, the control unit 20 of the safety module 9, 33, 37 may be parametrized via a field bus 11. For example, a characteristic of the safety module describing a switch-off behavior may be set and/or changed via the field bus 11. Parametrizing may e.g. be carried out via a programmable logic controller connected to the field bus 11. This advantageously allows for a simple implementation.

In another embodiment of a safety module 9, 33, 37, a plurality of characteristics describing the switch-off behavior of a safety module 9, 33, 37 are stored in a safety module 9, 33, 37 by way of a standard or, respectively, by the production facility, wherein the characteristics differ from one another and a user may thus set a desired switch-off behavior of the safety module 9, 33, 97 using standard characteristics without involving too much time. Setting a characteristic describing the switch-off behavior of a safety module 9, 33, 37 may in this context be carried out e.g. via the sensors 38, 39 or via a field bus 11.

In another embodiment of a safety module 9, 33, 37, the first supply output 81 and/or the second supply output 82 are protected by a reverse battery protection. As a result, it is possible that the components of the safety module 9, 33 37 are protected against erroneous connecting of a consumer and the resulting electrical currents.

In another embodiment of a safety module 9, 33, 37, the first supply output 81 and/or the second supply output 82 comprises a feed-back-protection device. The feed-back-protection device prevents an electrical current from flowing from the first supply output 81 and/or the second supply output 82 to the supply input 80. In this manner, further electrical devices electrically connected to the supply input 80 are protected. It is also possible that the feed-back-protection device is implemented in the first detection device 21 and/or in the first switching element 19 and/or in the second detection device 38 and/or in the second switching element 34.

In an embodiment of a safety module 9, 33, 37, the information relating to the securing of the first supply output 81 or of the second supply output 82, in particular an electrical voltage detected by the first detection device 21 or by the second detection device 36, a detected electrical current, a detected time-related development of the electrical voltage or of the electrical current, a time period monitored by the control unit 20, within which the first switching element 19 or the second switching element 34 limits an electrical current, may be stored in a memory unit integrated in the control unit 20. During storing, a time stamp may be added to the information relating to the securing of the first supply output 81 or of the second supply output 82. In this manner, a more precise monitoring of the state by a programmable logic controller connected via the field bus 11 is advantageously enabled.

In an embodiment of a safety module 9, 33, 37, the safety module 9, 33, 37 comprises an early-warning function. If e.g. an electrical current detected by the first or second detection device 21, 36 exceeds a previously determined percentage value of a set nominal current, this is visualized within the framework of the early-warning function by a visual signal. This event, i.e. the exceeding, may also be transmitted to the field-bus-subscriber 8 as an information relating to the securing of the first supply output 81 or the second supply output 82.

In another embodiment of a safety module 9, 33, 37, occurred events such as the exceeding of a specific electrical current detected by the first or second detection device 21, 36 may be counted by the control unit 20. Thereby, it is advantageously possible to determine an exact number of specific events without involving too much time. This advantageously allows for monitoring the state. For example, a strongly fluctuating current draw of a connected consumer may thus be determined relatively easily.

In an embodiment of a safety module 9, 33, 37, the information relating to the securing of the first supply output 81 or of the second supply output 82, in particular a predetermined value range of an electrical voltage, of an electrical current, of a time-dependent development of the electrical voltage or of the electrical current or of a time period within which the first switching element 19 or the second switching element 34 limits an electrical current, is stored in another field-bus subscriber 8. The other field-bus subscriber 8 may in this context in particular be a programmable logic controller controlling e.g. a machine in an application-specific manner. If a safety module 9, 33, 37 e.g. has to be exchanged due to a defect, e.g. the information relating to the securing of the first supply output 81 or of the second supply output 82 may be transferred via the field bus 11 from the programmable logic controller to an exchanged safety module 9, 33, 37. This advantageously allows for relatively quick restoring of the previously set value ranges.

In another embodiment of a safety module 9, 33, 37, the information relating to the securing of the first supply output 81 or of the second supply output 82 may be stored in the control unit 20 in a password-protected manner. Preferably, the password-protected information is stored in an encoded form. The password protection advantageously protects the information relating to the securing of the first supply output 81 or of the second supply output 82 against any unauthorized changes.

In an embodiment of a safety module 9, 33, 37, the sensors 38, 39 connected to the control unit 20 may be deactivated or, respectively, activated. If the sensors 38, 39 connected to the control unit 20 are deactivated, an unintended change of the settings of the safety module 9, 33, 37 may advantageously be prevented.

In another embodiment of a safety module 9, 33, 37, the control unit 20 automatically actuates the first switching element 19 or the second switching element 34 in order to electrically connect the supply input 80 to the first supply output 81 or the second supply output 82 within regular time intervals. After each electrical connecting of the supply input 80 to the first supply output 81 or the second supply output 82, the control unit 20 monitors a parameter of the supply power and/or a parameter of the secured supply power with the first detection device 21 or the second detection device 36. If the monitored parameter of the supply power and/or the parameter of the secured supply power exceeds a predetermined value range, the control unit again actuates the first switching element 19 or the second switching element 34 in order to electrically disconnect the supply input 80 from the first supply output 81 or the second supply output 82. This advantageously allows for automatic repair using the safety module 9, 33, 37.

In another embodiment of a safety module 9, 33, 37, the consumer 3 connected to the first supply output 81 and connected to the field-bus system 7 by the signal module 10 or the further consumer 35 connected to the second supply output 82 may be an actuator such as a valve or an electrical motor, in particular a D.C. motor, a sensor such as a pressure or temperature sensor, a field-bus coupler, an electrical conductor and/or another capacitive or inductive load known in the field of industrial automation.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A safety module for a field-bus system comprising:
a switch-on unit,
a control unit,
a supply input embodied to feed in a supply power into the safety module,
a first supply output embodied to relay the supply power to a consumer as a secured supply power,
a first switching element embodied to electrically connect or to electrically disconnect the supply input and the first supply output, and
a supply module embodied to provide an operating power via an operating-power-supply line for operating the control unit,
wherein the supply module is electrically connected to the supply input by a supply line and a supply-connecting line comprising the supply input and to a field-bus-power input by a field-bus-power line and a field-bus-power-connecting line,
wherein the field-bus-power input is embodied to feed in a field-bus power into the safety module for operating the switch-on unit,
wherein the supply module is embodied to generate the operating power either from the supply power or from the field-bus power,
wherein the switch-on unit is connected to the control unit via a data line and embodied to connect the safety module to a field-bus subscriber via a field bus, as a result of which an exchange of field-bus data is enabled between the control unit and the field-bus subscriber, and
wherein the control unit is connected to the first switching element and embodied to secure relaying the supply power via the first supply output as a secured supply power by actuating the first switching element.

2. The safety module according to claim 1, wherein the supply module is embodied to generate the operating power from the field-bus power in case that the supply power is in a range outside of a predetermined supply-power-value range.

3. The safety module according to claim 1, wherein:
the control unit is embodied to monitor a parameter of the supply power and/or a parameter of the secured supply power within a framework of securing of the first supply output by a first detection device connected to the control unit, and
the control unit is embodied to electrically disconnect the supply input and the first supply output by the first switching element within the framework of the securing, as soon as the monitored parameter lies outside of a predetermined value range.

4. The safety module according to claim 1, wherein the control unit is embodied to exchange an information relating to securing of the first supply output with the field-bus subscriber by the exchange of field-bus data via the switch-on unit.

5. The safety module according to claim 4, wherein:
the control unit is embodied to transmit the information relating to the securing to the field-bus subscriber, and
the information relating to the securing of the first supply output is an electrical voltage detected by the first detection device, a detected electrical current, a detected time-related development of the electrical voltage or of the electrical current, a detected switching state of the first switching element or a time duration monitored by the control unit within which the first switching element limits an electrical current.

6. The safety module according to claim 4, wherein:
the control unit is embodied to receive the information relating to the securing from the field-bus subscriber, and
the information relating to the securing of the first supply output is a predetermined value range of an electrical voltage, of an electrical current, of a time-related development of the electrical voltage or of the electrical current, or a time duration within which the first switching element limits an electrical current.

7. The safety module according to claim 1, comprising:
a first isolation device,
wherein the first isolation device is switched in the field-bus-power-connecting line, wherein the field-bus-power-connecting line comprises a first section and a second section, and
wherein the first isolation device is embodied to galvanically disconnect the first section and the second section of the field-bus-power-connecting line.

8. The safety module according to claim 1, comprising:
a second isolation device, wherein the second isolation device is switched in the data line, wherein the data line comprises a first section and a second section, and wherein the second isolation device is embodied to galvanically disconnect the first section and the second section of the data line.

9. The safety module according to claim 1, comprising: a second supply output embodied to relay the secured supply power to a further consumer, and a second switching element provided to electrically connect or disconnect the supply input and the second supply output, wherein the second switching element is connected to the control unit and the first switching element and the second switching element are actuated independently from each other by the control unit, wherein the control unit is embodied to relay the supply power as a secured supply power via the second supply output by actuating the second switching element, wherein the control unit is embodied to monitor a further parameter of the supply power and/or a further parameter of the secured supply power within a framework of securing of the second supply output by a second detection device connected to the control unit, wherein the control unit is embodied to electrically disconnect the supply input and the second supply output by the second switching element within the framework of the securing, as soon as the further monitored parameter lies outside of a further predetermined value range, and wherein the control unit is embodied to exchange an information relating to the securing of the second supply output with the field-bus subscriber by the exchange of field-bus data via the switch-on unit.

10. The safety module according to claim 1, wherein the switch-on unit, the control unit, the first switching element and the supply module are arranged in a shared housing.

11. The safety module according to claim 10, wherein: the housing comprises a side face, the side face is embodied to directly abut on a further side face of a further housing of a signal module embodied for connecting the consumer to the field-bus system, the first supply output is embodied at the side face as a contact structure, and the contact structure is embodied to directly abut on a further supply input of the signal module embodied at the further side face as a further contact structure for relaying the secured supply power and to electrically contact the further contact structure, as a result of which the safety module is directly added to the signal module.

12. The safety module according to claim 10, wherein: the housing comprises a front side embodied transversely to the side face, and the second supply output for relaying the secured supply power to the further consumer is embodied as a contact element that is accessed from the front side for electrical contacting.

13. A field-bus system comprising:
a field-bus subscriber,
a safety module embodied as a further field-bus subscriber of the field-bus system, and
a signal module embodied as a further field-bus subscriber of the field-bus system for connecting a consumer to the field-bus system,
wherein the field-bus subscriber, the safety module and the signal module are connected with one another via a field bus,
wherein the safety module comprises a switch-on unit, a control unit, a supply input embodied to feed in a supply power into the safety module, a first supply output embodied to relay the supply power to a consumer as a secured supply power, and a first switching element embodied to electrically connect or disconnect the supply input and the first supply output,
wherein the switch-on unit is connected to the control unit via a data line and embodied to connect the safety module to a field-bus subscriber via a field bus, as a result of which an exchange of field-bus data is enabled between the control unit and the field-bus subscriber,
wherein the control unit is connected to the first switching element and embodied to secure the relaying of the supply power as a secured supply power via the first supply output by actuating the first switching element,
wherein the signal module comprises a further control unit and a further switch-on unit,
wherein the further switch-on unit is connected to the further control unit via a further data line and embodied to connect the signal module to the field-bus subscriber via the field bus, as a result of which an exchange of field-bus data is enabled between the further control unit and the field-bus subscriber,
wherein the further control unit is embodied for connecting the consumer to the field-bus system,
wherein the signal module comprises a further supply input embodied to feed in the secured supply power and a further supply output embodied for relaying the secured supply power to the consumer, and
wherein the first supply output and the further supply input are electrically connected to each other.

14. The field-bus system according to claim 13, wherein:
the safety module comprises a supply module embodied to provide an operating power via an operating-power-supply line for operating the control unit,
the supply module is electrically connected to the supply input by a supply line and a supply-connecting line and to a field-bus-power input by a field-bus-power line and a field-bus-power-connecting line,
wherein the field-bus-power input is embodied to feed a field-bus power into the safety module for operating the switch-on unit, and
wherein the supply module is embodied to generate the operating power either from the supply power or from the field-bus power.

15. The field-bus system according to claim 13, wherein:
the switch-on unit, the control unit, the first switching element and the supply module are arranged in a shared housing,
the further switch-on unit, the further control unit and a further switching element for actuating the consumer by the further control unit are arranged in a further housing,
the housing comprises a side face,
the side face directly abuts on a further side face of the further housing of the signal module,
the first supply output is embodied as a contact structure at the side face, and
the contact structure directly abuts on a further supply input of the signal module embodied at the further side face as a further contact structure for relaying the secured supply power, as a result of which the safety module is directly added to the signal module.

* * * * *